United States Patent
Adjakple et al.

(10) Patent No.: US 11,997,617 B2
(45) Date of Patent: May 28, 2024

(54) METHOD AND DEVICE FOR POWER HEADROOM REPORTING IN 5G NR

(71) Applicant: InterDigital Patent Holdings, Inc., Wilmington, DE (US)

(72) Inventors: Pascal M. Adjakple, Great Neck, NY (US); Qing Li, Princeton Junction, NJ (US); Guodong Zhang, Woodbury, NY (US); Stephen E. Terry, Northport, NY (US); Allan Y. Tsai, Boonton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/763,610

(22) PCT Filed: Nov. 15, 2018

(86) PCT No.: PCT/US2018/061232
§ 371 (c)(1),
(2) Date: May 13, 2020

(87) PCT Pub. No.: WO2019/099634
PCT Pub. Date: May 23, 2019

(65) Prior Publication Data
US 2020/0288412 A1    Sep. 10, 2020

Related U.S. Application Data

(60) Provisional application No. 62/586,593, filed on Nov. 15, 2017.

(51) Int. Cl.
H04W 52/00 (2009.01)
H04L 5/00 (2006.01)
(Continued)

(52) U.S. Cl.
CPC ......... *H04W 52/365* (2013.01); *H04L 5/0092* (2013.01); *H04W 52/367* (2013.01); *H04W 72/0446* (2013.01); *H04W 80/02* (2013.01)

(58) Field of Classification Search
None
See application file for complete search history.

(56) References Cited

U.S. PATENT DOCUMENTS

2011/0243016 A1   10/2011   Zhang et al.
2012/0178494 A1    7/2012   Haim et al.
(Continued)

FOREIGN PATENT DOCUMENTS

CN    102595477 A    7/2012
CN    102934370 A    2/2013
(Continued)

OTHER PUBLICATIONS

ETSI TS 138 321 V15.3.0 (2018-09) 5G; NR; Medium Access Control (MAC) protocol specification (3GPP TS 38.321 version 15.3.0 Release 15) All pages (Year: 2018).*
(Continued)

*Primary Examiner* — Brandon M Renner
(74) *Attorney, Agent, or Firm* — Flaster Greenberg, P.C.

(57) ABSTRACT

A number of power headroom solutions are disclosed, including but not limited to signaling of a bandwidth part (BWP) specific maximum outpower by a gNB to a UE, signaling of a beam specific maximum output power by the gNB to the UE, signaling by the UE to the gNB of the UE setting of BWP configured maximum transmit output power, signaling by the UE to the gNB of the UE setting of beam or group of beam configured maximum transmit output power, signaling by the UE to the gNB of BWP specific power headroom report, signaling by the UE to the gNB of beam or group of beam specific power headroom report and
(Continued)

rules for power headroom reporting when the UE has overlapping resource grants.

12 Claims, 20 Drawing Sheets

(51) Int. Cl.
*H04W 52/36* (2009.01)
*H04W 72/0446* (2023.01)
*H04W 80/02* (2009.01)

(56) References Cited

U.S. PATENT DOCUMENTS

| | | | |
|---|---|---|---|
| 2012/0257519 A1 | 10/2012 | Frank et al. | |
| 2013/0028225 A1 | 1/2013 | Ko et al. | |
| 2013/0128856 A1* | 5/2013 | Iwai | H04L 5/001 |
| | | | 370/329 |
| 2015/0382205 A1 | 12/2015 | Lee et al. | |
| 2016/0066284 A1 | 3/2016 | Kwon et al. | |
| 2017/0195020 A1 | 7/2017 | Ko et al. | |
| 2017/0195998 A1 | 7/2017 | Zhang et al. | |
| 2017/0223641 A1 | 8/2017 | Haim et al. | |
| 2017/0265176 A1* | 9/2017 | Marinier | H04W 52/365 |
| 2020/0084735 A1* | 3/2020 | Cheng | H04W 52/34 |
| 2020/0145936 A1* | 5/2020 | Lee | H04W 52/42 |
| 2020/0288413 A1* | 9/2020 | Ahn | H04W 52/44 |
| 2020/0374866 A1* | 11/2020 | Takeda | H04W 72/0413 |

FOREIGN PATENT DOCUMENTS

| | | | | |
|---|---|---|---|---|
| CN | 103119859 A | | 5/2013 | |
| CN | 103299690 A | | 9/2013 | |
| CN | 109586866 A | * | 4/2019 | ........... H04B 7/0621 |
| EP | 3200498 A1 | | 8/2017 | |
| WO | 2010/065759 A2 | | 6/2010 | |
| WO | 2014/109685 A1 | | 7/2014 | |
| WO | 2016/003235 A1 | | 1/2016 | |
| WO | 2017/118687 A1 | | 7/2017 | |
| WO | 2017/146773 A1 | | 8/2017 | |
| WO | WO-2019017583 A1 | * | 1/2019 | ........... H04B 17/309 |

OTHER PUBLICATIONS

3GPP TS 36.133 V15.0.0, "3rd Generation Partnership Project; Technical Specification Group Radio Access Network; Evolved Universal Terrestrial Radio Access (E-UTRA); Requirements for Support of Radio Resource Management (Release 15)", Sep. 2017, 2663 pages.
3GPP TS 36.213 V14.3.0, "3rd Generation Partnership Project; Technical Specification Group Radio Access Network; Evolved Universal Terrestrial Radio Access (E-UTRA); Physical Layer Procedures (Release 14)", Jun. 2017, 460 pages.
3GPP TS 36.321 V14.4.0, "3rd Generation Partnership Project; Technical Specification Group Radio Access Network; Evolved Universal Terrestrial Radio Access (E-UTRA); Medium Access Control (MAC) Protocol Specification (Release 14)", Sep. 2017, 108 pages.
3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol Specification (Release 14)", Sep. 2017, 753 pages.
3GPP TSG-RAN WG2 Meeting #100 R2-1712788, InterDigital Inc., "Power Headroom Reporting for NR", Dec. 2017, 2 pages.
3GPP TSG-RAN WG2 Meeting #100 R2-1712915, Lenovo, Motorola Mobility, "PHR for NR CA", Dec. 2017, 3 pages.
3GPP TSG-RAN WG2 Meeting #100 R2-1712916, Lenovo et al., "PHR MAC DE format", Dec. 2017, 3 pages.
3GPP TSG-RAN WG2 Meeting #100 R2-1713007, vivo, "PHR Impacts for Beamforming", Dec. 2017, 5 pages.
3GPP TSG-RAN WG2 Meeting #100 R2-1713176, Huawei, HiSilicon, "Remaining Issues of PHR Procedure and Power Management", Dec. 2017, 5 pages.
3GPP TSG-RAN WG2#100 R2-1713177, Huawei, Hisilicon, "PHR With Multi-Beam Operation", Dec. 2017, 6 pages.
ITU-R Radiocommunication Sector of ITU, Recommendation Itu-R M.2083-0, "IMT Vision—Framework and Overall Objectives of the Future Development of IMT for 2020 and Beyond", Sep. 2015, 21 pages.
Ericsson, "On bandwidth parties", R1-1711565, 3GPP TSG RAN WG1 NR Ad-Hoc#2, Jun. 2017, 3 Pages.
LG Electronics Inc., "PHR for wider bandwidth operation", R2-1711613, 3GPP TSG-RAN WG2 Meeting #99bis, Oct. 2017, pp. 4.
LG Electronics Inc., "PHR for wider bandwidth operation", R2-1709064, 3GPP TSG-RAN2 WG2 Meeting RAN2 #99, Aug. 2017, 4 Pages.
Huawei et al., "SRS switching among CCs and bandwidth parts", 3GPP TSG RAN WG1 NR Ad-Hoc Meeting, R1-1709976, Jun. 2017, pp. 4.

* cited by examiner

| BWP₅ | BWP₄ | BWP₃ | BWP₂ | BWP₁ | R | R | R |
|---|---|---|---|---|---|---|---|
| P | V | PH (Type 2, PBWP) ||||||
| R | R | $P_{CMAX, BWP}$ 1 ||||||
| P | V | PH (Type 1, PBWP) ||||||
| R | R | $P_{CMAX, BWP}$ 2 ||||||
| P | V | PH (Type x, BWP 1) ||||||
| R | R | $P_{CMAX, BWP}$ 3 ||||||

...

| P | V | PH (Type x, BWP n) |
|---|---|---|
| R | R | $P_{CMAX, BWP}$ m |

FIG. 8

| BWP₆ | BWP₅ | BWP₄ | BWP₃ | BWP₂ | BWP₁ | R | R |
|---|---|---|---|---|---|---|---|
| P | V | PH (Type x, BWP 1) ||||||
| R | R | PH (Type x, BWP 1) |||||||

| BWP₆ | BWP₅ | BWP₄ | BWP₃ | BWP₂ | BWP₁ | R | R |
|------|------|------|------|------|------|---|---|
| P | V | PH (Type x, BWP 1) | | | | | |
| R | R | P_{CMAX, BWP} 1 | | | | | |
| P | V | PH (Type x, BWP 2) | | | | | |
| R | R | P_{CMAX, BWP} 2 | | | | | |
| P | V | PH (Type x, BWP 3) | | | | | |
| R | R | P_{CMAX, BWP} 3 | | | | | |

...

| P | V | PH (Type x, BWP n) |
|---|---|---|
| R | R | P_{CMAX, BWP} n |

FIG. 9

| $C_7$ | $C_6$ | $C_5$ | $C_4$ | $C_3$ | $C_2$ | $C_1$ | R |
|---|---|---|---|---|---|---|---|
| $BWP_{2C2}$ | $BWP_{1C2}$ | $BWP_{3C1}$ | $BWP_{2C1}$ | $BWP_{1C1}$ | $BWP_{3PC}$ | $BWP_{2PC}$ | $BWP_{1PC}$ |
| $BWP_{1C5}$ | $BWP_{3C4}$ | $BWP_{2C4}$ | $BWP_{1C4}$ | $BWP_{3C3}$ | $BWP_{2C3}$ | $BWP_{1C3}$ | $BWP_{3C2}$ |
| $BWP_{3C7}$ | $BWP_{2C7}$ | $BWP_{1C7}$ | $BWP_{3C6}$ | $BWP_{2C6}$ | $BWP_{1C6}$ | $BWP_{3C5}$ | $BWP_{2C5}$ |
| P | V | PH (Type 2, PBWP) | | | | | |
| R | R | $P_{CMAX, BWP}$ 1 | | | | | |
| P | V | PH (Type 2, PUCCH SBWP) | | | | | |
| R | R | $P_{CMAX, BWP}$ 2 | | | | | |
| P | V | PH (Type 1, PBWP) | | | | | |
| R | R | $P_{CMAX, BWP}$ 3 | | | | | |
| P | V | PH (Type x, BWP 1) | | | | | |
| R | R | $P_{CMAX, BWP}$ 4 | | | | | |

...

| P | V | PH (Type x, BWP n) | | | | | |
|---|---|---|---|---|---|---|---|
| R | R | $P_{CMAX, BWP}$ m | | | | | |

FIG. 10

| $B_5$ | $B_4$ | $B_3$ | $B_2$ | $B_1$ | R | R | R |
|---|---|---|---|---|---|---|---|
| P | V | \multicolumn{6}{c}{PH (Type 2, PB)} |
| R | R | \multicolumn{6}{c}{$P_{CMAX, B}$ 1} |
| P | V | \multicolumn{6}{c}{PH (Type 1, PB)} |
| R | R | \multicolumn{6}{c}{$P_{CMAX, B}$ 2} |
| P | V | \multicolumn{6}{c}{PH (Type x, B 1)} |
| R | R | \multicolumn{6}{c}{$P_{CMAX, B}$ 3} |

...

| P | V | PH (Type x, B n) |
|---|---|---|
| R | R | $P_{CMAX, B}$ m |

FIG. 11

| B₆ | B₅ | B₄ | B₃ | B₂ | B₁ | R | R |
|---|---|---|---|---|---|---|---|
| P | V | | | | PH (Type x, B 1) | | |
| R | R | | | | $P_{CMAX, B}$ 1 | | |
| P | V | | | | PH (Type x, B 2) | | |
| R | R | | | | $P_{CMAX, B}$ 2 | | |
| P | V | | | | PH (Type x, B 3) | | |
| R | R | | | | $P_{CMAX, B}$ 3 | | |

...

| P | V | PH (Type x, B n) |
|---|---|---|
| R | R | $P_{CMAX, B}$ n |

FIG. 12

| C$_7$ | C$_6$ | C$_5$ | C$_4$ | C$_3$ | C$_2$ | C$_1$ | R |
|---|---|---|---|---|---|---|---|
| B$_{2C2}$ | B$_{1C2}$ | B$_{3C1}$ | B$_{2C1}$ | B$_{1C1}$ | B$_{3PC}$ | B$_{2PC}$ | B$_{1PC}$ |
| B$_{1C5}$ | B$_{3C4}$ | B$_{2C4}$ | B$_{1C4}$ | B$_{3C3}$ | B$_{2C3}$ | B$_{1C3}$ | B$_{3C2}$ |
| B$_{3C7}$ | B$_{2C7}$ | B$_{1C7}$ | B$_{3C6}$ | B$_{2C6}$ | B$_{1C6}$ | B$_{3C5}$ | B$_{2C5}$ |
| P | V | PH (Type 2, PB) | | | | | |
| R | R | P$_{CMAX, B}$ 1 | | | | | |
| P | V | PH (Type 2, PUCCH SB) | | | | | |
| R | R | P$_{CMAX, B}$ 2 | | | | | |
| P | V | PH (Type 1, PB) | | | | | |
| R | R | P$_{CMAX, B}$ 3 | | | | | |
| P | V | PH (Type x, B 1) | | | | | |
| R | R | P$_{CMAX, B}$ 4 | | | | | |

...

| P | V | PH (Type x, B n) | | | | | |
|---|---|---|---|---|---|---|---|
| R | R | P$_{CMAX, B}$ m | | | | | |

FIG. 13

METHOD AND DEVICE FOR POWER HEADROOM REPORTING IN 5G NR

CROSS-REFERENCE TO RELATED APPLICATIONS

This application is the National Stage Application of International Patent Application No. PCT/US2018/061232 filed Nov. 15, 2018, which claims the benefit of U.S. Provisional Application No. 62/586,593 filed Nov. 15, 2017, the content of which is hereby incorporated by reference in its entirety.

BACKGROUND

International Mobile Telecommunications (IMT) for 2020 and beyond is envisaged to expand and support diverse families of usage scenarios and applications that may continue beyond the current IMT (see ITU-R M.2083). A broad variety of capabilities may be tightly coupled with these intended different usage scenarios and applications for IMT for 2020 and beyond.

The families of usage scenarios for IMT for 2020 and beyond include but are not limited to eMBB (enhanced Mobile Broadband), URLLC (Ultra-Reliable and Low Latency Communications) and mMTC (massive Machine Type Communication. These use cases have diverse and conflicting service requirements in terms of latency, data rates, mobility, device density, reliability, UE battery life, network energy consumption, etc. In light of these diverse and conflicting service requirements that the next generation international mobile telecommunication system may support, 3GPP has identified a set of system architecture requirements. The following are example requirements that the architecture of the next generation system may support:
  The RAN architecture may support tight interworking between the new RAT and LTE and may consider high performing inter-RAT mobility and aggregation of data flows via at least dual connectivity between LTE and new RAT. This may be supported for both collocated and non-collocated site deployments;
  The CN architecture and the RAN architecture may allow for C-plane/U-plane separation;
  The RAN architecture may support connectivity through multiple transmission points, either collocated or non-collocated. The RAN architecture may enable a separation of control plane signaling and user plane data from different sites. The RAN architecture may support interfaces supporting effective inter-site scheduling coordination;
  Different options and flexibility for splitting the RAN architecture may be allowed. The RAN architecture may allow deployments using Network Function Virtualization;
  The CN architecture and the RAN architecture may allow for the operation of Network Slicing;
  Support for services that have different latency requirements between the UE and the Data Network;
  Support for multiple simultaneous connections of an UE via multiple access technologies;
  Support for the transmission of IP packets, non-IP PDUs and Ethernet frames;
  Support for network sharing;
  Allowing independent evolutions of core network and RAN and minimizing access dependencies;
  Downlink and uplink functionality related to multi-antenna transmission/reception enabling closed loop and open/semi-open loop transmissions, beam management, interference measurement, Type I codebook-based CSI acquisition, and Type II CSI acquisition, as well as CSI acquisition for reciprocity-based operations, the associated reference signal designs, and related quasi-colocation assumptions; and
  Necessary physical layer mechanisms including UL power control.

In light of the requirements above and the multitude and variety of services and verticals the 5G system is expected to support, an efficient power control and power headroom reporting in 5G network may be key for a stable and efficient 5G network operation while ensuring the available network capacity is allocated in a way that is consistent with the operator objective to get the most profit out of the provided services while delivering a superior customer experience and complying to regulatory requirements for prioritization of critical communications and emergency calls.

SUMMARY

Methods and systems for power head room reporting are disclosed. Example methods and systems may include but are not limited to signaling of a bandwidth part (BWP) specific maximum outpower by a gNB to a UE, signaling of a beam specific maximum output power by the gNB to the UE, signaling by the UE to the gNB of the UE setting of BWP configured maximum transmit output power, signaling by the UE to the gNB of the UE setting of beam or group of beam configured maximum transmit output power, signaling by the UE of BWP specific power headroom reporting, and signaling by the UE of beam or group of beam specific power headroom reporting.

The methods and systems disclosed herein may also include solutions for transmission of waveform differences in power headroom reporting, solutions for power headroom reporting control taking into account power headroom reporting timing, power headroom reporting estimation time interval and impact to power headroom reporting, various new events for power headroom reporting, and new PHR MAC control elements proposals for BWP based power headroom reporting and beam or group of beams based power headroom reporting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 8 shows a first example of a BWP based PHR MAC Control Element;

FIG. 9 shows a second example of a BWP based PHR MAC Control Element;

FIG. 10 shows an example of a BWP based Extended PHR MAC Control Element;

FIG. 11 shows a first example of a Beam based PHR MAC Control Element;

FIG. 12 shows a second example of a Beam based PHR MAC Control Element;

FIG. 13 shows an example Beam based Extended PHR MAC Control Element; and

DETAILED DESCRIPTION OF ILLUSTRATIVE EMBODIMENTS

Example Communication System and Networks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 1A:
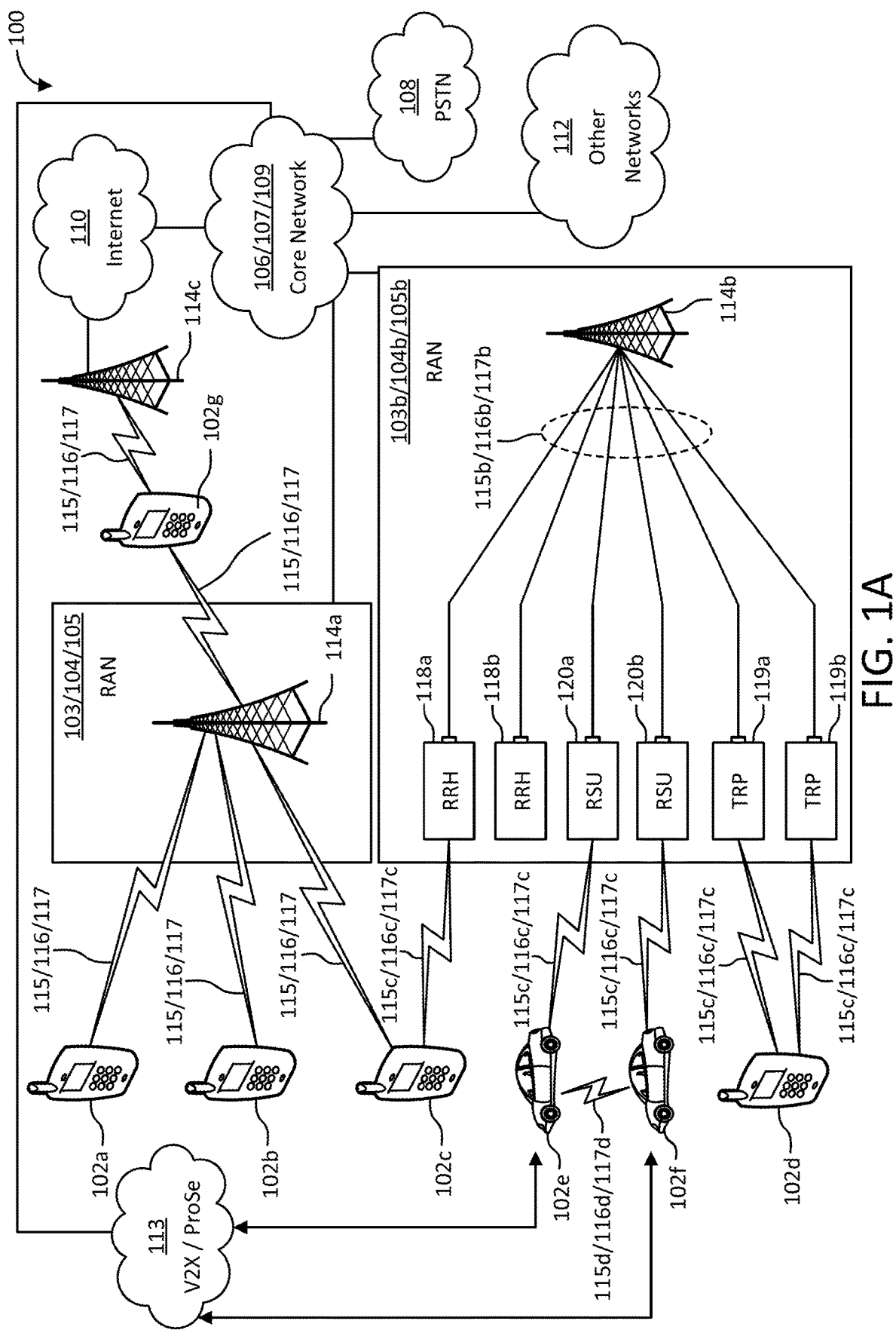
FIG. 1A illustrates one embodiment of an example communications system in which the methods and apparatuses described and claimed herein may be embodied.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
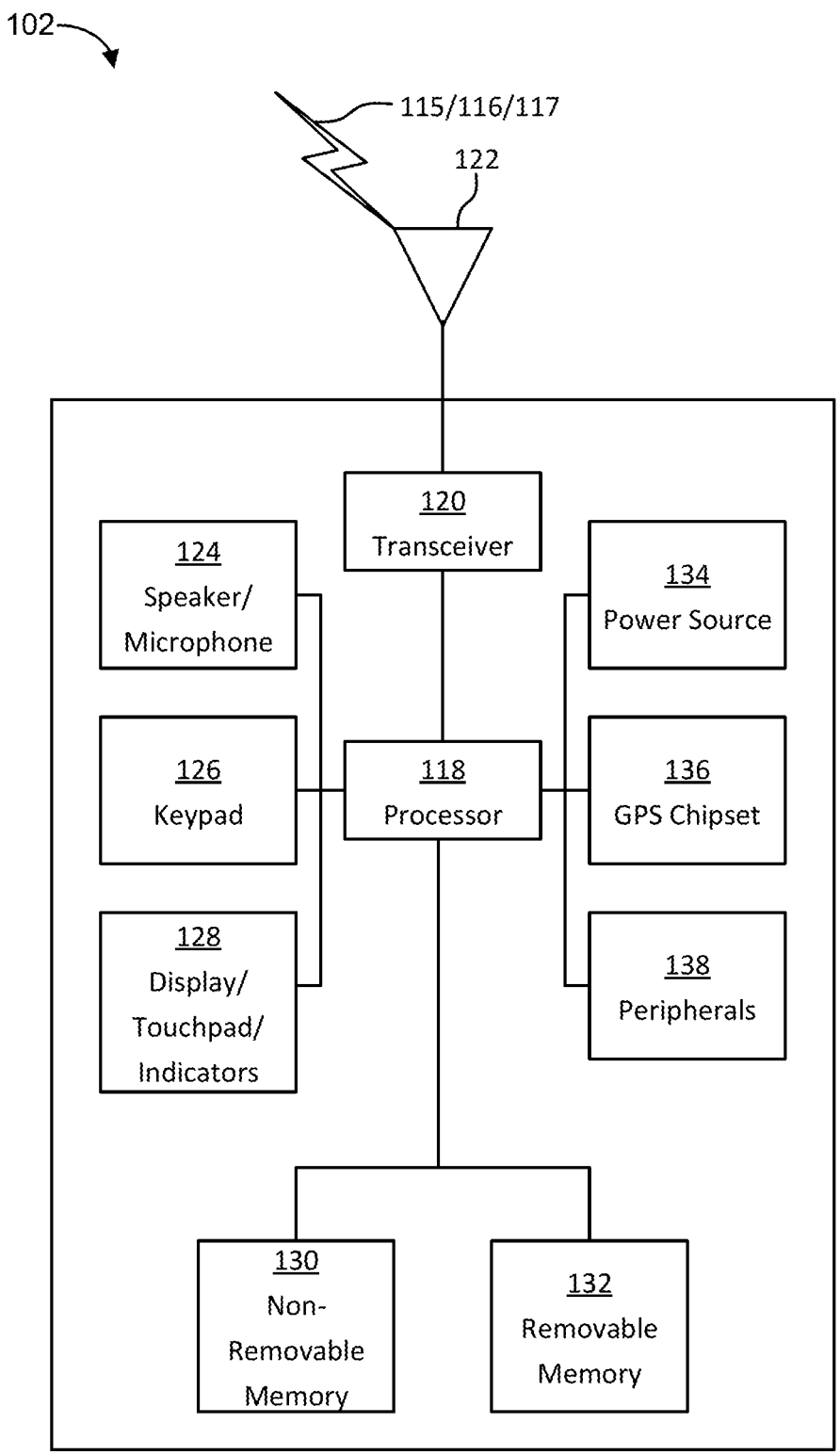
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
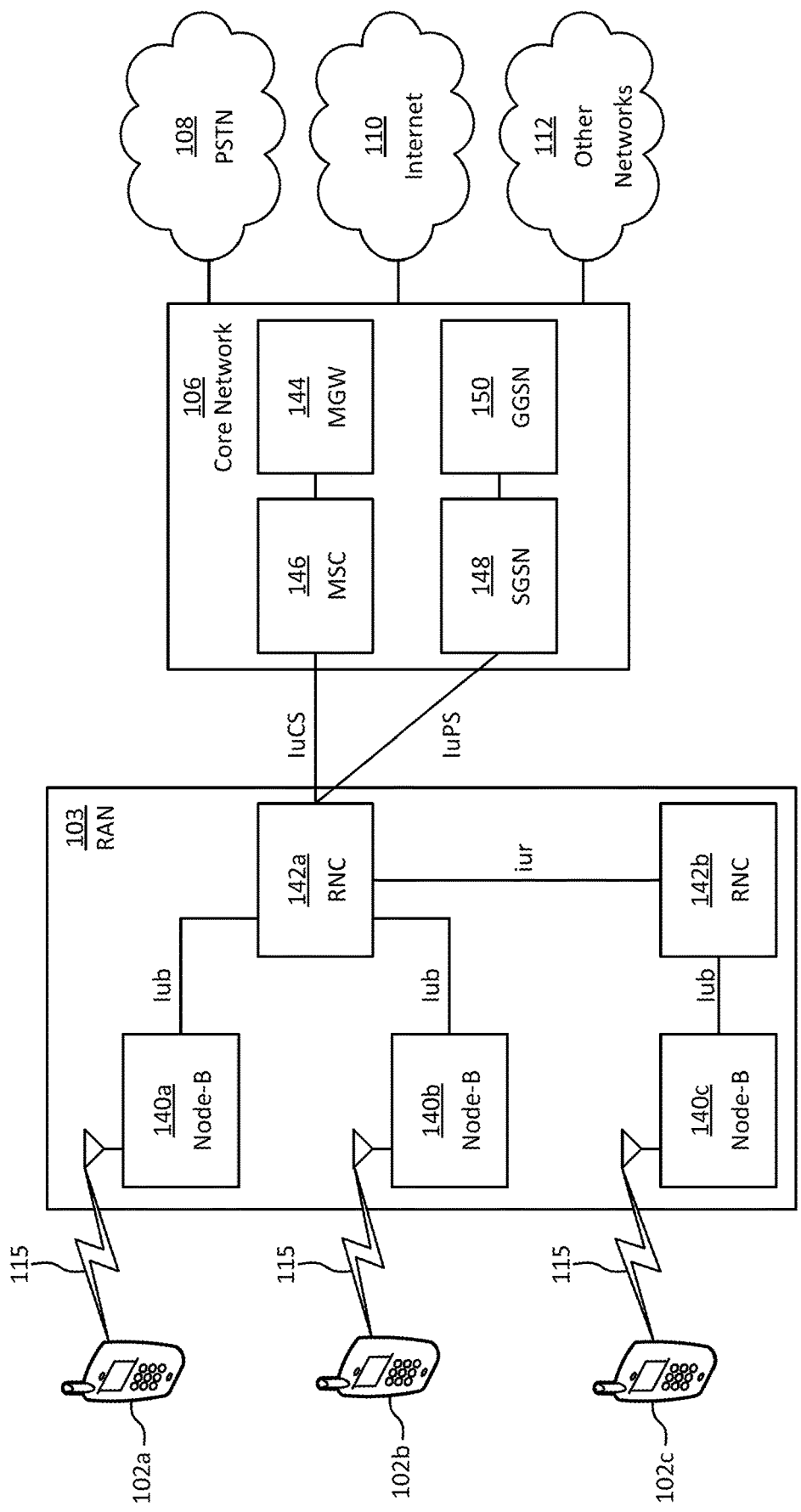
FIG. 1C is a system diagram of an example radio access network (RAN) and core network in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
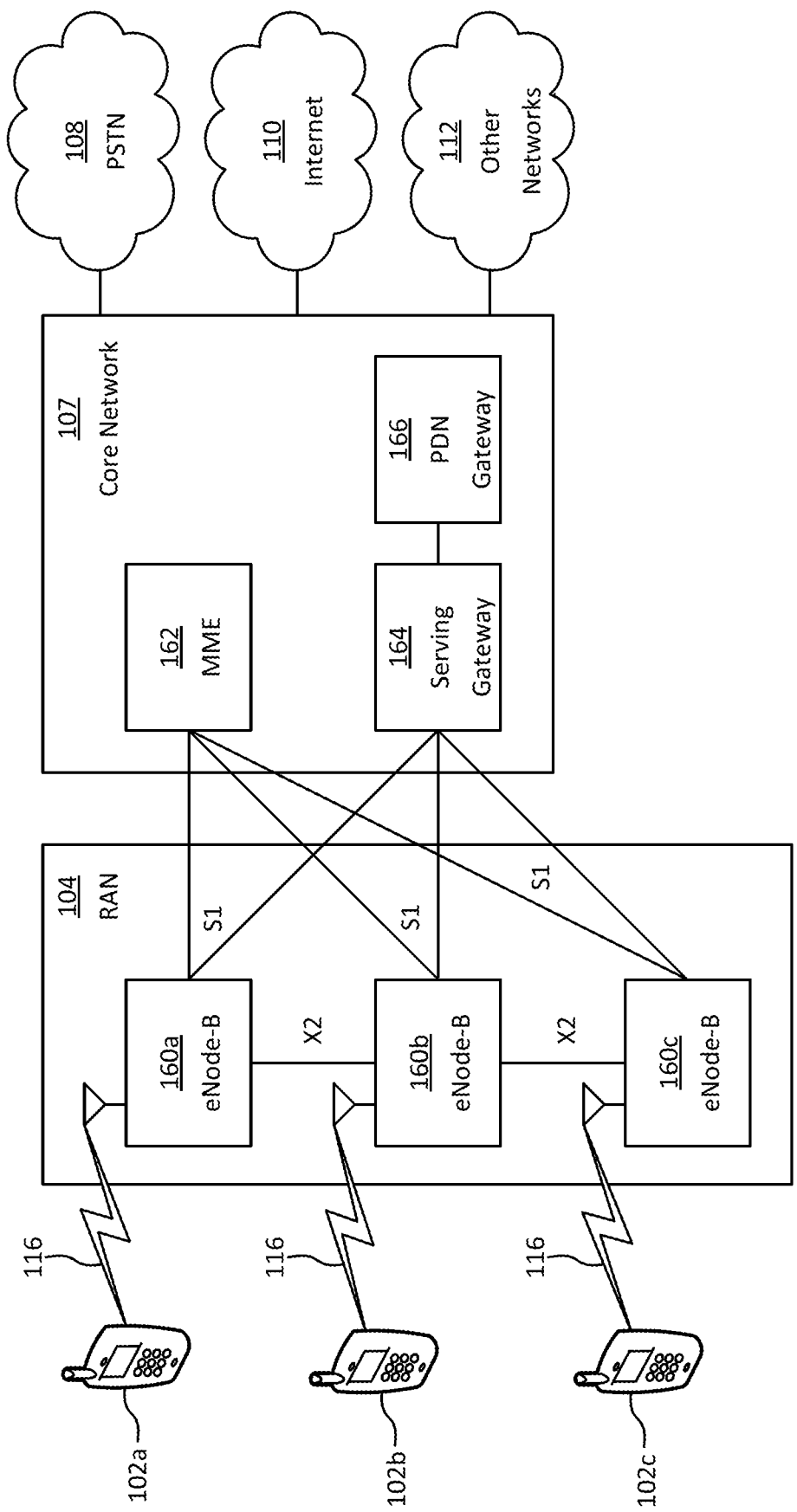
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
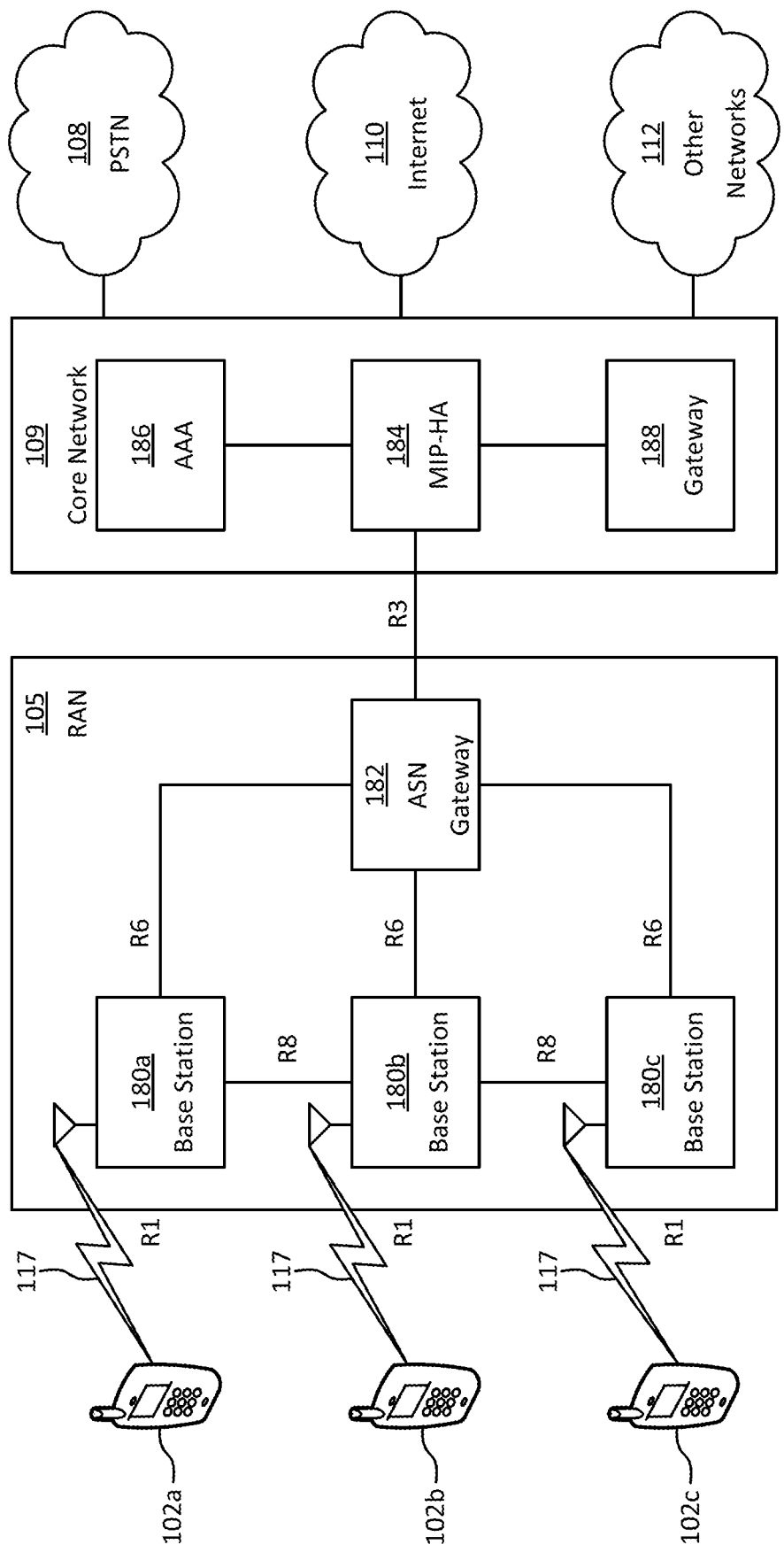
FIG. 1E is another system diagram of a RAN and core network according to another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
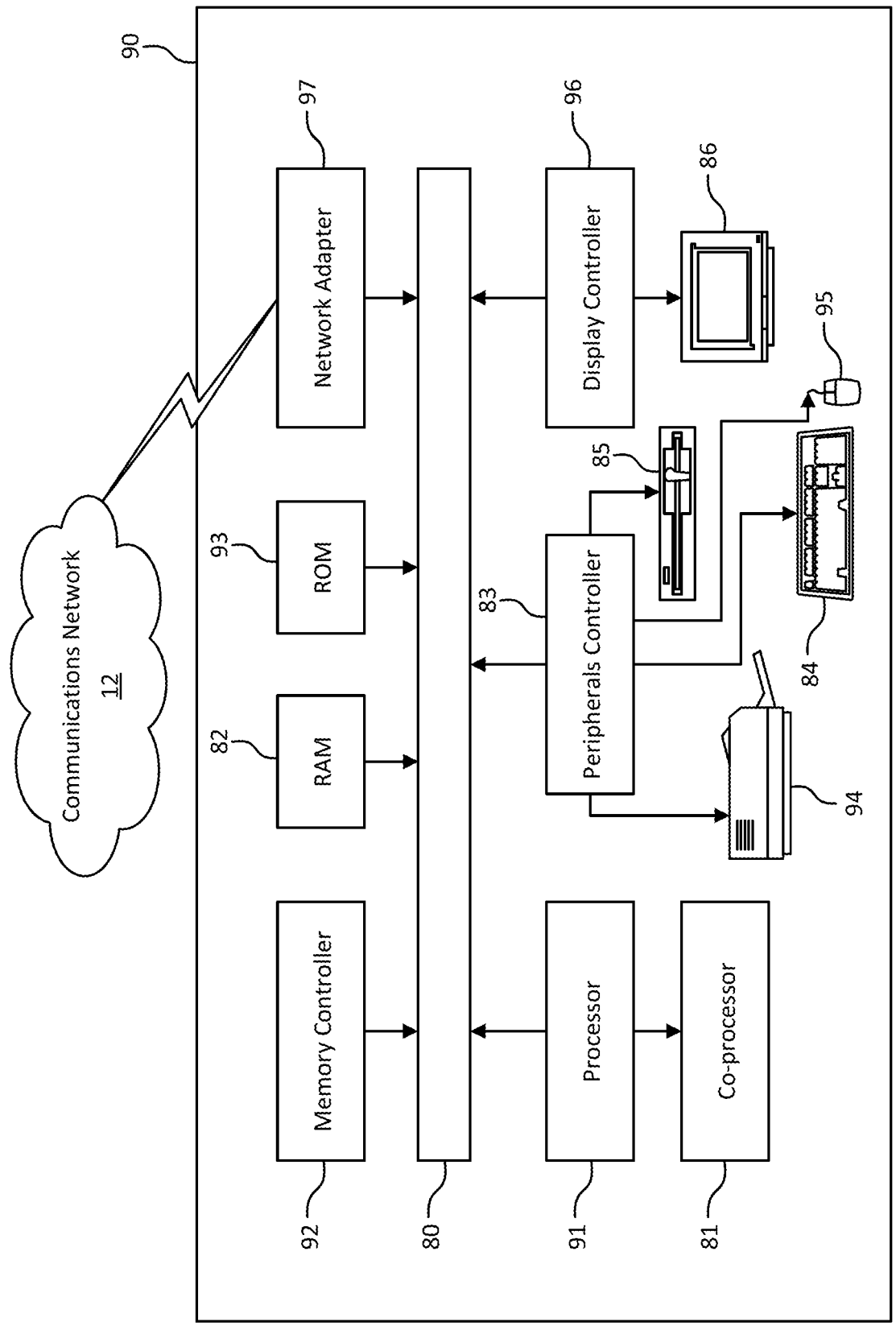
FIG. 1F is a block diagram of an exemplary computing system 90 in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
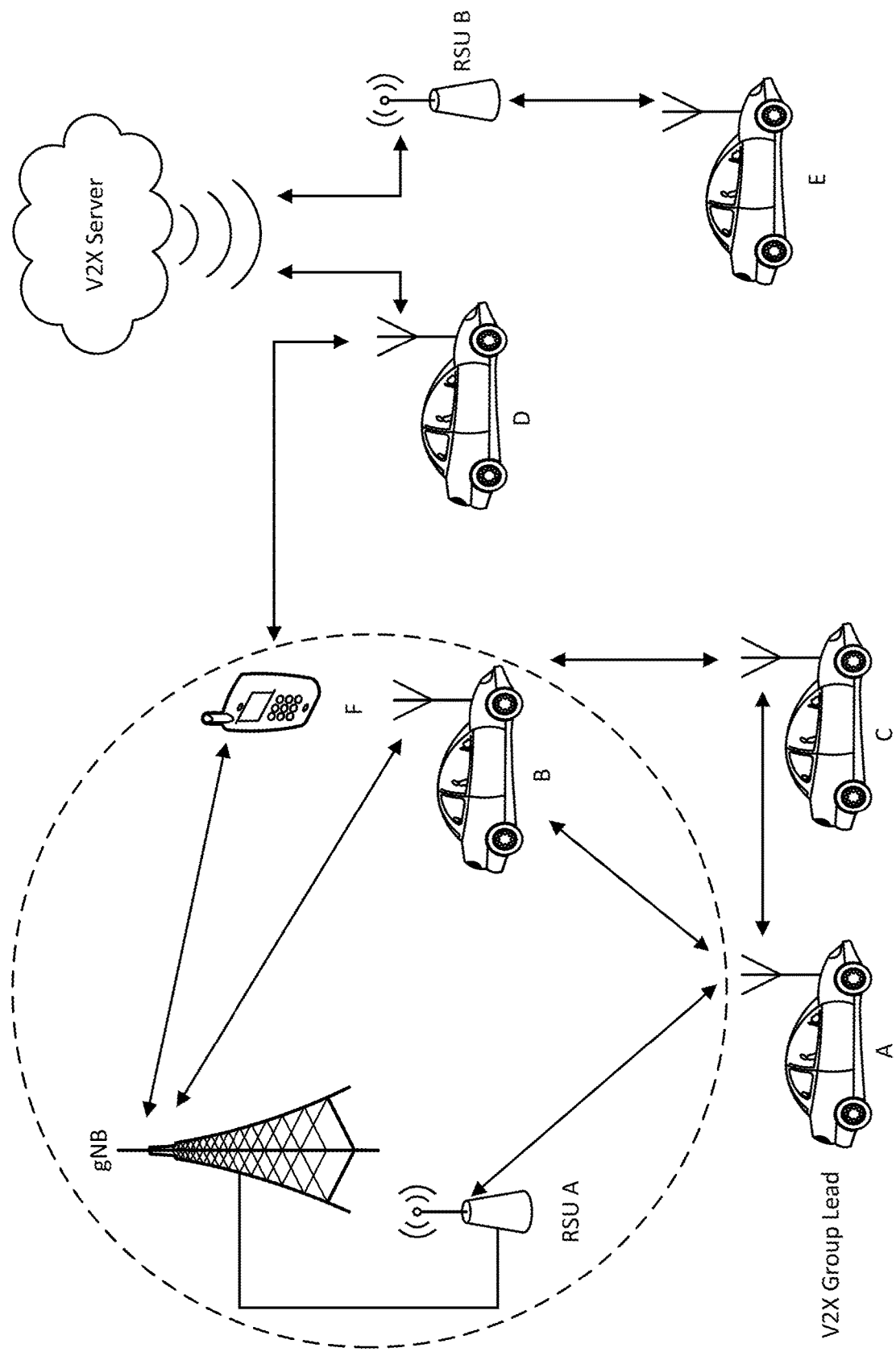
FIG. 1G is a block diagram of an example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The following is a list of acronyms relating to service layer technologies that may appear in the description below. Unless otherwise specified, the acronyms used herein refer to the corresponding term listed below:

3GPP 3$^{rd}$ Generation Partnership Project
ACLR Adjacent Channel Leakage Ratio
A-MPR Additional MPR
BWP BandWidthPart
CA Carrier Aggregation
CC Component Carrier
CN Core Network
CP/C-Plane Control Plane
CP Cyclic Prefix
CP-OFDM CP OFDM
CSR-RS CSI reference signal
CSI Channel State Information
DC Dual Connectivity
DCI Downlink Control Information
DFT Discrete Fourier Transform
DFT-S Discrete Fourier Transform Spread
DFT-S-OFDM Discrete Fourier Transform Spread Orthogonal Frequency Division Multiplexing
DL Downlink
eMBB enhanced Mobile Broadband
eNB Evolved Node B
FDD Frequency Division Duplex
gNB: g Node B, A RAN node which supports the NR as well as connectivity to NGC
ID or Id Identity or Identifier
IFFT Inverse Fast Fourier Transform
IMT International Mobile Telecommunications
IP Internet Protocol
LC Logical Channel
LCID LC ID
LCP Logical Channel Prioritization
LTE Long Term Evolution
MAC Medium Access Control
MAC CE MAC Control Element
MCG Master Cell Group
MPR Maximum Power Reduction
MTC Machine-Type Communications
mMTC Massive Machine Type Communication
NGC Next Generation Core network
NR New Radio
OFDM Orthogonal Frequency Division Multiplexing
PAPR Peak to Average Power Ratio
PCell Primary Cell
PB Primary Beam
PDCCH Physical Downlink Control Channel
PDU Packet Data Unit
PHY Physical Layer
PH Power Headroom
PHR PH Report
P-MPR Power Management Maximum Power Reduction
PSCell Primary Secondary Cell
PUCCH Physical Uplink Control CHannel
PUSCH Physical Uplink Shared CHannel
PHY PHYsical for (physical layer or sublayer)
RAN Radio Access Network
RAN1 RAN working group 1
RAN2 RAN working group 2
RAT Radio Access Technology
RRC Radio Resource Control
RRM Radio Resources Management
SBWP Secondary BWP with PUCCH SCell resources
SCell Secondary Cell
SCG Secondary Cell Group
SCH Shared Channel
SDU Service Data Unit
SIB System Information Block
SpCell Special Cell. For Dual Connectivity operation, the term Special Cell refers to the PCell of the MCG or the PSCell of the SCG, otherwise the term Special Cell refers to the PCell.
SR Scheduling Request
SRS Sounding Reference Symbols or Sounding Reference Signal
SS Synchronization Signal or Synchronization Symbol
SSB SS Block
TRP Transmission and Reception Point
TTI Transmission Time Interval
Tx Transmitter
UDP User Datagram Protocol
UE User Equipment
UL Uplink
ULPC UL Power Control
UL-SCH Uplink SCH
UP/U-Plane User Plane
URLLC Ultra-Reliable and Low Latency Communications In LTE, Power Headroom reporting may be used to provide the serving eNB with information about the difference between the nominal UE maximum transmit power and the estimated power for UL-SCH transmission or SRS transmission per activated Serving Cell, as well as with information about the difference between the nominal UE maximum power and the estimated power for UL-SCH and PUCCH transmission on SpCell and PUCCH SCell. The term SpCell (Special Cell) as used herein may be defined as follows: for Dual Connectivity operation, the term Special Cell refers to the PCell of the MCG or the PSCell of the SCG; otherwise the term Special Cell refers to the Pcell.

There are three types of power headroom reports defined in LTE: Type 1, Type 2 and Type 3 (see 3GPP TS 36.213, "Evolved Universal Terrestrial Radio Access (E-UTRA); Physical layer procedures, V14.4.0"). Power Headroom Type 1 reporting reflects the power headroom assuming PUSCH-only transmission on the carrier. Power Headroom Type-2 reporting combines PUSCH and PUCCH transmissions. Power Headroom Type 3 reflects the power headroom assuming SRS-only transmission on the carrier.

For a UE not configured with a secondary cell, power headroom may provide the serving eNB with information about the differences between the UE configured maximum output power ($P_{CMAX}$) defined in 3GPP TS 36.101 and the estimated power for UL-SCH transmission of the serving cell. In this case, the UE may meet requirements for power headroom Type 1.

For a UE configured with a secondary cell, power headroom may provide the serving eNB with information about the differences between the UE configured maximum output power ($P_{CMAX,c}$) defined in 3GPP TS 36.101 and the estimated power for UL-SCH transmission per activated serving cell c, or the estimated power for simultaneous PUSCH and PUCCH transmission on Pcell (see 3GPP TS 36.101, "Evolved Universal Terrestrial Radio Access (E-UTRA); User Equipment (UE) radio transmission and reception, V15.0.0"). In this case, the UE may meet requirements for both power headroom Type 1 and Type 2.

A UE power headroom may be valid for subframe i for serving cell, therefore the reported power headroom may be estimated over 1 subframe.

RRC controls Power Headroom reporting by configuring the two timers periodicPHR-Timer and prohibitPHR-Timer, and by signaling dl-PathlossChange which sets the change in measured downlink pathloss and the required power backoff due to power management (as allowed by P-MPRc defined in 36.101) to trigger a PHR.

When extendedPHR is not configured, the Type 1 power headroom may be estimated for the primary serving cell as defined in clause 5.1.1.2 of 3GPP TS 36.213 (see 3GPP TS 36.321, "Evolved Universal Terrestrial Radio Access (E-UTRA); Medium Access Control (MAC) protocol specification, V14.4.0").

When extendedPHR is configured, the Type 1 and Type 2 power headroom may be estimated for each activated serving cell with configured uplink as defined in clause 5.1.1.2 of 3GPP TS 36.213.

In LTE, a Power Headroom Report (PHR) may be triggered if one or more of the following events occur:

A prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

A periodicPHR-Timer expires;

Upon configuration or reconfiguration of the power headroom reporting functionality by upper layers, which is not used to disable the function;

Activation of an SCell of any MAC entity with configured uplink;

Addition of the PSCell; and

ProhibitPHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management (as allowed by P-MPRc defined in 3GPP TS 36.101) for this cell has changed more than dl-PathlossChange dB since the last transmission of a PHR when the MAC entity had UL resources allocated for transmission or PUCCH transmission on this cell.

If the MAC entity has UL resources allocated for new transmission for this TTI, the MAC entity may perform one or more of the following:

(1) if it is the first UL resource allocated for a new transmission since the last MAC reset, start periodicPHR-Timer;

(2) if the Power Headroom reporting procedure determines that at least one PHR has been triggered and not cancelled, and;

(3) if the allocated UL resources can accommodate the MAC control element for PHR which the MAC entity is configured to transmit, plus its subheader, as a result of logical channel prioritization:

(a) if extendedPHR is configured:
  (i) for each activated Serving Cell with configured uplink:
    (A) obtain the value of the Type 1 or Type 3 power headroom;
    (B) if the MAC entity has UL resources allocated for transmission on this Serving Cell for this TTI: obtain the value for the corresponding $P_{CMAX,c}$ field from the physical layer;
  (ii) if simultaneous PUCCH-PUSCH is configured or a serving cell operating according to Frame Structure Type 3 with uplink is configured and activated:
    (A) obtain the value of the Type 2 power headroom for the PCell;
    (B) obtain the value for the corresponding $P_{CMAX,c}$ field from the physical layer (see subclause 5.1.1.2 of 3GPP TS 36.213);
  (iii) instruct the Multiplexing and Assembly procedure to generate and transmit an Extended PHR MAC control element for extendedPHR as defined in subclause 6.1.3.6a based on the values reported by the physical layer;

(b) else if extendedPHR2 is configured:
  (i) for each activated Serving Cell with configured uplink:
    (A) obtain the value of the Type 1 or Type 3 power headroom;
    (B) if the MAC entity has UL resources allocated for transmission on this Serving Cell for this TTI: obtain the value for the corresponding $P_{CMAX,c}$ field from the physical layer;
  (ii) if a PUCCH SCell is configured and activated:
    (A) obtain the value of the Type 2 power headroom for the PCell and PUCCH SCell;
    (B) obtain the values for the corresponding $P_{CMAX,c}$ fields from the physical layer (see subclause 5.1.1.2 of 3GPP TS 36.213);
  (iii) else:
    (A) if simultaneous PUCCH-PUSCH is configured for the PCell or a serving cell operating according to Frame Structure Type 3 with uplink is configured and activated: obtain the value of the Type 2 power headroom for the PCell; and/or obtain the value for the corresponding $P_{CMAX,c}$ field from the physical layer (see subclause 5.1.1.2 of 3GPP TS 36.213);
  (iv) instruct the Multiplexing and Assembly procedure to generate and transmit an Extended PHR MAC control element for extendedPHR2 according to configured ServCellIndex and the PUCCH(s) for the MAC entity as defined in subclause 6.1.3.6a of 3GPP TS 36.321 based on the values reported by the physical layer;

(c) else if dualConnectivityPHR is configured:
  (i) for each activated Serving Cell with configured uplink associated with any MAC entity:
    (A) obtain the value of the Type 1 or Type 3 power headroom;

(B) if this MAC entity has UL resources allocated for transmission on this Serving Cell for this TTI or if the other MAC entity has UL resources allocated for transmission on this Serving Cell for this TTI and phr-ModeOtherCG is set to real by upper layers: obtain the value for the corresponding $P_{CMAX,c}$ field from the physical layer;

(ii) if simultaneous PUCCH-PUSCH is configured or a serving cell operating according to Frame Structure Type 3 with uplink is configured and activated:

(A) obtain the value of the Type 2 power headroom for the SpCell;

(B) obtain the value for the corresponding $P_{CMAX,c}$ field for the SpCell from the physical layer (see subclause 5.1.1.2 of 3GPP TS 36.213);

(iii) obtain the value of the Type 2 power headroom for the SpCell of the other MAC entity;

(iv) if phr-ModeOtherCG is set to real by upper layers: obtain the value for the corresponding $P_{CMAX,c}$ field for the SpCell of the other MAC entity from the physical layer (see subclause 5.1.1.2 of 3GPP TS 36.213);

(v) instruct the Multiplexing and Assembly procedure to generate and transmit a Dual Connectivity PHR MAC control element as defined in subclause 6.1.3.6b of 3GPP TS 36.321 based on the values reported by the physical layer;

(d) else:

(i) obtain the value of the Type 1 or Type 3 power headroom from the physical layer;

(ii) instruct the Multiplexing and Assembly procedure to generate and transmit a PHR MAC control element as defined in subclause 6.1.3.6 of 3GPP TS 36.321 based on the value reported by the physical layer;

(e) start or restart periodicPHR-Timer;

(f) start or restart prohibitPHR-Timer;

(g) cancel all triggered PHR(s).

In NR, PHR may continue to be used to facilitate the gNB's uplink scheduling. However, there may be some difference in NR PHR compared to LTE. Some of the potential reasons for differences in NR PHR versus LTE PHR are listed below:

Support for different numerologies/TTI lengths within the same CC or on different CCs and potential support for numerology specific power control and numerology specific PHR;

Potential support for service specific power control and power headroom reporting;

Support for different BWP within a wider component carrier bandwidth;

Support for multi-beam operation, beam switching and potentially beam specific UL power control;

Support for multiple waveforms and impact to PHR when Tx waveform change;

Support for multi-connectivity including multi-TRP; and

Support for different architecture of Power Amplifier (PA) mapping to Component Carrier (CC), to BandWidth-Part (BWP), or to Beams.

In fact, RAN1 has already addressed the following with respect to UL Power Control (ULPC):

Support beam specific pathloss for ULPC;

NR Support DFT-S-OFDM based waveform complementary to CP-OFDM waveform, at least for eMBB uplink for up to 40 GHz; and Ability for the network to decide and communicate to the UE which one of CP-OFDM and DFT-S-OFDM based waveforms to use.

Furthermore, the following were also considered in RAN1 for further study:

Beam specific power control parameters; and

Numerology specific power control (e.g., numerology specific power control parameters).

Various new events have been proposed in RAN1 and RAN2 contributions but the details of the definition of these events and the UE behaviors with respect to these events have not been discussed.

The granularity of PHR reporting (e.g., cell level, beam level and BWP level) in NR needs to be investigated and addressed. The existing LTE PHR format needs to be analyzed in light of potential PHR reporting granularity in NR and a new PHR reporting format needs to be decided. In LTE, the parameter P-Max may be signaled by the eNB to the UE and may be used to limit the UE's uplink transmission power on a carrier frequency (see 3GPP TS 36.331 "Evolved Universal Terrestrial Radio Access (E-UTRA); Radio Resource Control (RRC) Protocol specification, V14.4.0"). In NR, a component carrier may consist of multiple BWPs, and possibly more than one active BWP beyond NR Rel-15. Some of the BWPs within the component carrier may be close to each other while others might be separated by a much wider frequency separation, especially considering the fact that NR component carriers may be much wider bandwidth component carriers than that of LTE. When BWPs are very close to each other, they are likely to be served by the same PA or modeled as one LTE-like CC, while for BWPs with somewhat large frequency separation, these BWP may be handled by different PA or modelled as different LTE-like CC. The possibility of BWP or group of BWPs specific P-Max should therefore be investigated. Similarly, NR transmissions involving wider beams (e.g., SSB based beam) as well as transmissions involving narrower beams (e.g., CSI-RS based beam), possibly with the same UE at the same time, are being considered. Therefore, the possibility of beam or group of beam specific P-Max should be investigated.

In LTE, a UE power headroom is valid for a subframe (e.g., transmission occasion) for serving cell, therefore the reported power headroom is estimated over 1 subframe. It so happens that in LTE, the transmission time interval (TTI) duration is also 1 subframe, which is also the time interval between resource grant scheduling opportunities. The concept of TTI as transmission duration is changed in NR.

It is a common understanding that NR systems may support slot level scheduling, mini-slot level or non-slot level (e.g., symbol or subset of symbols) level scheduling. The gNB can schedule data transmission to the same UE with more than one of any of these scheduling time intervals at the same time, for example slot level or mini-slot level within the same numerology or over more than one numerology at the same time. Therefore, the data transmission duration (e.g., transmission time interval duration or the duration of a transmission occasion) in NR is variable and not fixed as in LTE. In this invention, the following terms may be used interchangeably: transmission time interval duration, transmit time duration, transmission duration, and transmission occasion duration.

Because of the variability of transmission duration in NR, the following issues may need to be addressed:

What is the time interval used for the estimation of power headroom? The time interval duration used for the estimation of a reported PHR whether this is a real PHR or virtual PHR may need to be known to both the UE and the gNB in order for the gNB to make proper scheduling decisions;

When is power headroom estimated, when is the PHR reported, and which grant is used for the PHR reporting in case of overlapping grants?

What type of PH is reported (e.g., is real PHR reported or virtual PHR reported)?

Examples use cases to consider may include non-overlapping grants, overlapping grants involving grants within the same cell or component carrier, and/or overlapping grants involving grants within different cell or component carrier (e.g., CA or DC). In the case of single cell or single component carrier operation with overlapping grants, the scenario for power headroom reporting illustrated in FIG. 2 may be considered. Assuming a slot level scheduling, the transmission occasion represented by a slot associated with numerology 1 overlaps with multiple multiple slots associated with numerology 2.

In LTE Carrier Aggregation (CA) or Dual Connectivity, PHRs for all activated serving cells may be reported by extended PHR. The PH value may be based either on an actual transmission (real PHR) or on a reference format when there is no actual transmission (virtual PHR). The virtual PH is considered useful for the uplink scheduling, but with possible loss of precision and accuracy compared with real PH which is calculated based on actual PUSCH or PUCCH transmission.

In legacy LTE, as the interval between the DCI reception with UL grant and the corresponding PUSCH transmission is fixed for all carriers, a UE may know whether or not any transmission is scheduled in the PHR reporting subframe on the activated serving cell when the UE calculates PHR. As the subframe length is the same for all carriers, the PHR reporting subframe for all CCs may be aligned.

In NR with CA operations or DC operations, there are some differences in PHR, including that the slot length on different CCs could be different and the interval between the DCI with UL grant and the scheduled UL transmission can be different on different cells.

Figure 3:
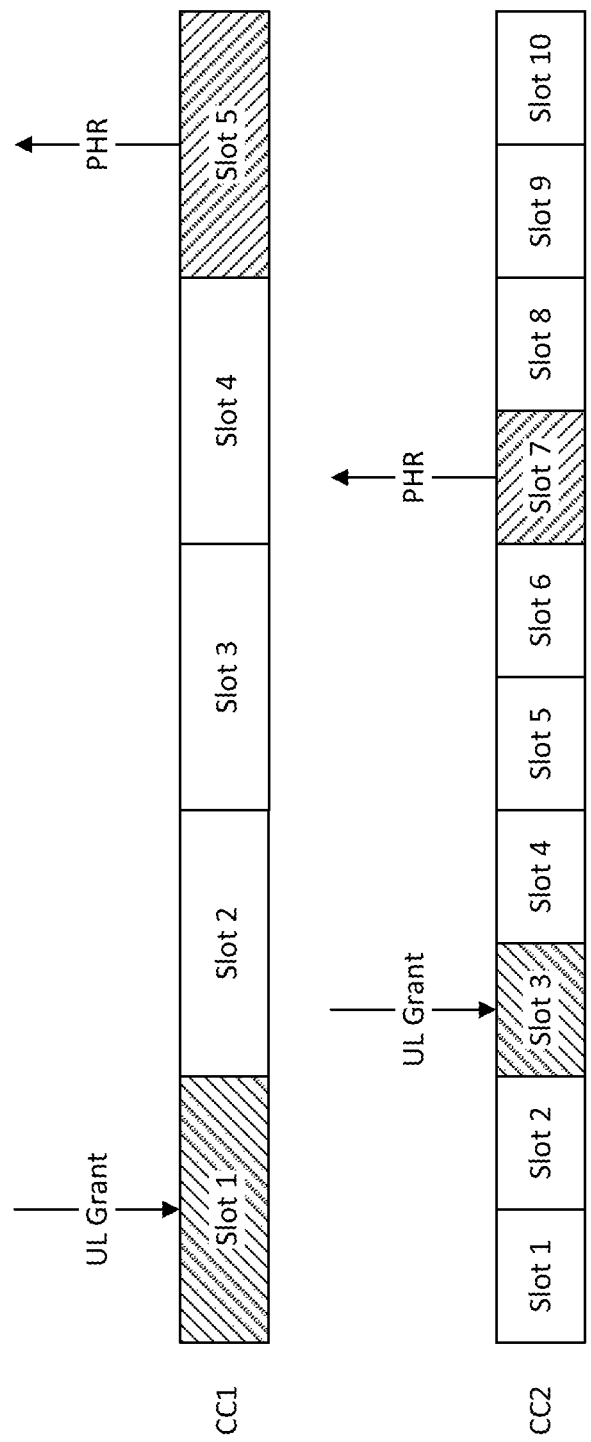
FIG. 3 shows a first example block diagram for PHR Reporting in different TTI lengths involving two Component Carriers configured with different numerologies.
Figure 4:
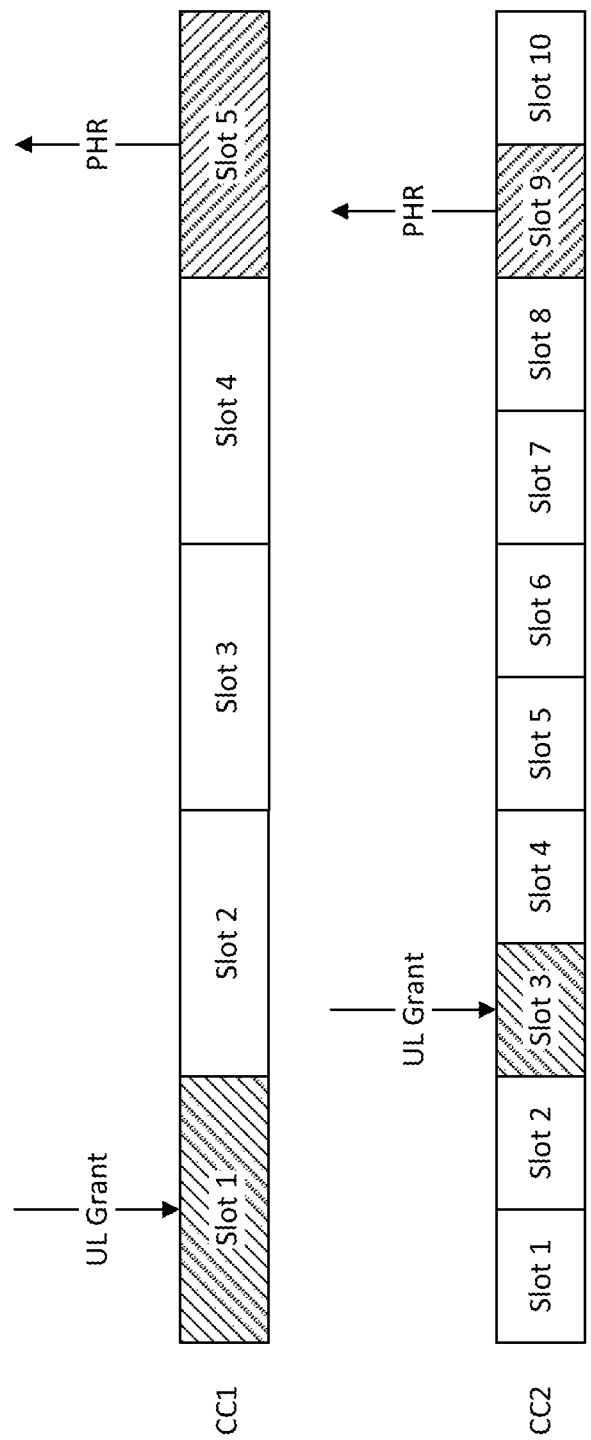
FIG. 4 shows a second example block diagram for PHR Reporting in different TTI lengths involving two Component Carriers configured with different numerologies.
Figure 5:
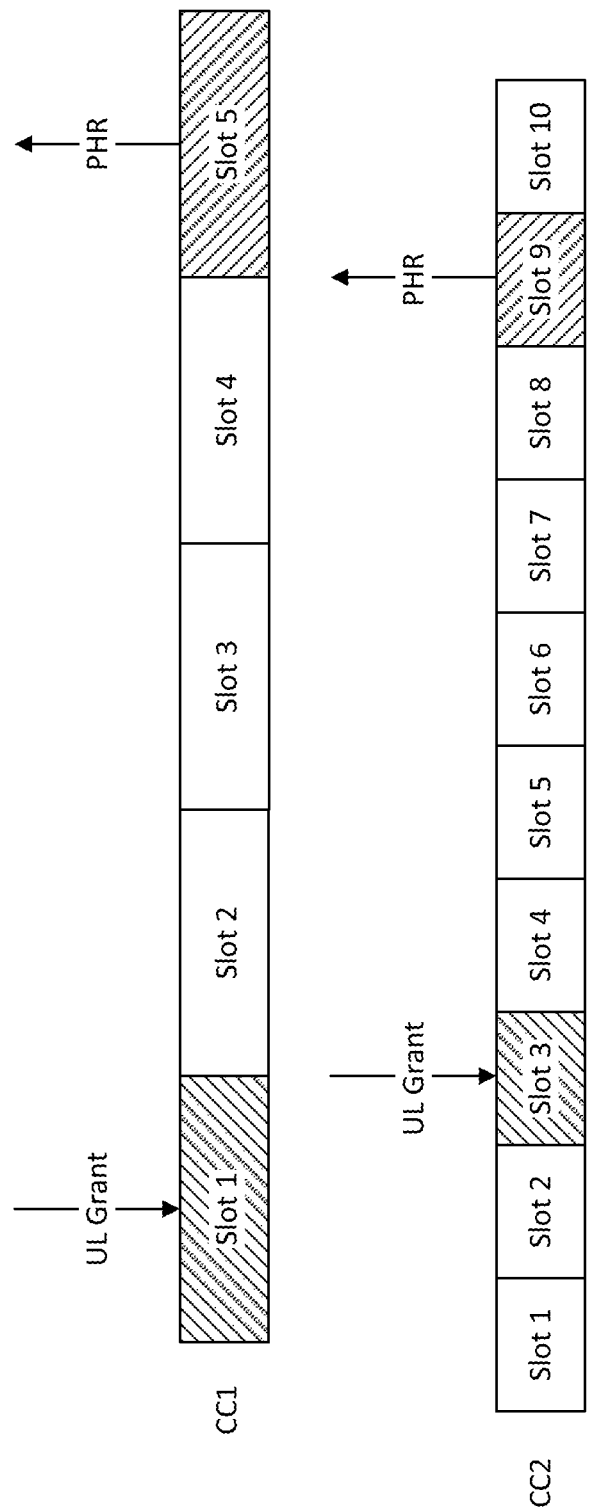
FIG. 5 shows a third example block diagram for PHR Reporting in different TTI lengths involving two Component Carriers configured with different numerologies.

For example, the UE may have a PHR triggered. Then, the UE receives a UL grant on CC1 and is going to send the PHR on CC1. Later the UE receives another UL grant in on CC2 which schedules the UL transmission on CC2 which could be earlier than or overlapped with the scheduled UL resource on CC1. Example scenarios are illustrated in FIG. 3 and FIG. 4, where the transmission occasion represented by a slot associated with numerology configured on CC1 overlaps with multiple slots associated with numerology configured on CC2. In addition to the issues regarding consideration of PH estimating timing raised above, an additional issue to address in this case is whether the PHR is sent on CC1 or CC2. An additional scenario that may be considered is the scenario where PHR estimation time intervals partially overlap as illustrated in FIG. 5.

PHR may be reported on carriers with PUSCH resource allocated. However, PH can be calculated for all active cells. In cases where PUSCH or PUCCH are not transmitted, PH may be calculated based on the reference format that is known to both the network and the UE. This type of PH is called a virtual PHR, meaning that the PH is calculated assuming virtual PUSCH or PUCCH transmission. The virtual PH is considered useful for the uplink scheduling, but with possible loss of precision and accuracy compared with real PH which is calculated based on actual PUSCH or PUCCH transmission.

Figure 6:
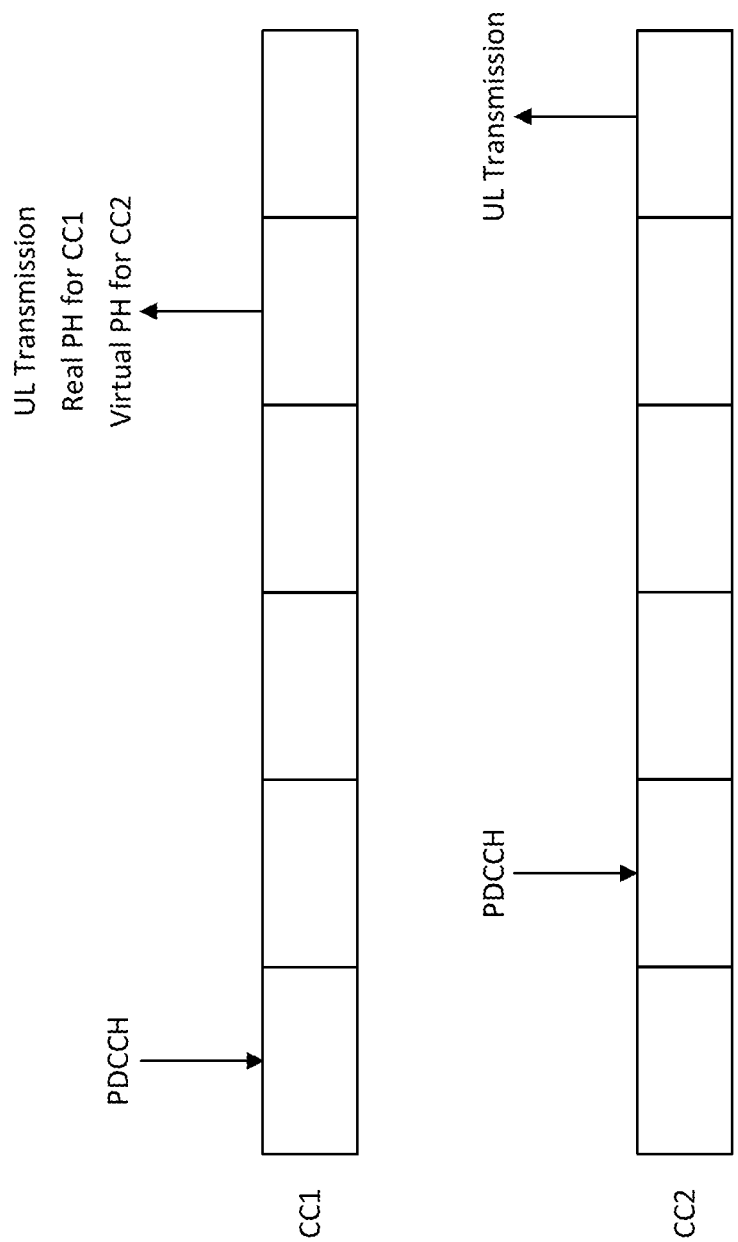
FIG. 6 shows an example block diagram of Power headroom reporting in LTE.

In LTE, the timing between the PDCCH order and the actual PUSCH transmission is fixed. Therefore, the UE can determine whether there are UL resources allocated for other carriers if UL resources are allocated for some of the carriers for the same TTI. Consequently, the UE can determine whether real or virtual PH should be calculated for each carrier, as illustrated in FIG. 6.

Figure 7:
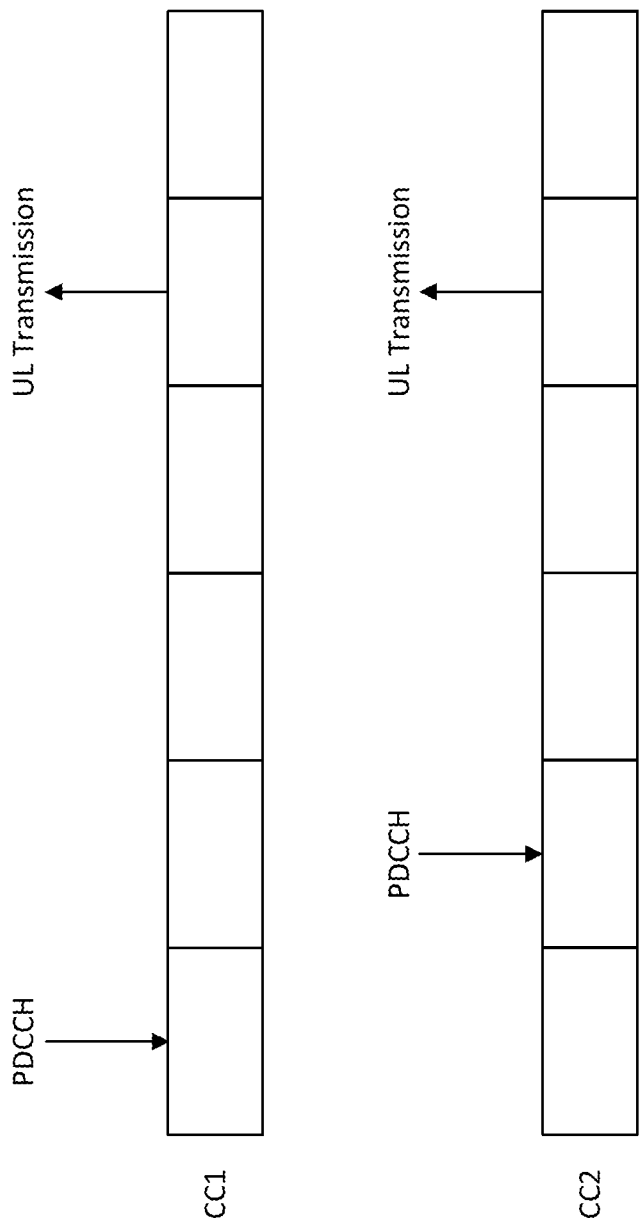
FIG. 7 shows an example block diagram of Power headroom reporting in NR.

In NR, the timing between the PDCCH order and the actual PUSCH transmission is not fixed due to different TTI length and flexible timing configurations. The timing can be reduced to zero in some cases when the self-contain subframe is used. The UE may not be aware of the UL resource allocation for a specific TTI until the PUSCH transmission is performed, as illustrated in FIG. 7. If the UE cancels all triggered PHR(s) before it confirms the resource allocation for the specific TTI, inaccurate PH(s) might be reported to the network. In 3GPP TS 36.321, it is specified that all PHR(s) are cancelled after the UE start or restart periodicPHR-Timer and prohibitPHR-Timer. However, RAN2 doesn't specify the exact time when periodicPHR-Timer and prohibitPHR-Timer start. The behavior of the UE in terms of periodicPHR-Timer and prohibitPHR-Timer initialization or re-initialization versus cancelation of triggered PHR may need to be further investigated to ensure accurate PHR reporting.

Another issue to consider is power allocation and power back-off rules for NR, such as power allocation rules in the context of LTE-NR dual connectivity or NR-LTE dual connectivity.

The following example solutions for power head room reporting are disclosed: (1) Signaling of BWP specific maximum outpower by the gNB to the UE; (2) Signaling of beam specific maximum output power by the gNB to the UE; (3) Signaling by the UE to the gNB of the UE setting of BWP configured maximum transmit output power; (4) Signaling by the UE to the gNB of the UE setting of beam or group of beam configured maximum transmit output power; (5) Signaling by the UE of BWP specific power headroom reporting; (6) Signaling by the UE of beam or group of beam specific power headroom reporting; (7) Solutions considering transmission waveform differences in power headroom reporting; (8) Solutions for power headroom reporting control taking into account power headroom reporting timing, power headroom reporting estimation time interval and impact to power headroom reporting for use case of PHR with non-overlapping grant, the use case of PHR with overlapping grants involving grant within the same cell or component carrier, and the use case of PHR with overlapping grants involving grants from different cells or component carriers; (9) Various new events for power headroom reporting; and (10) New PHR MAC control elements proposals for BWP based power headroom reporting and beam or group of beams based power headroom reporting.

Figure 14:
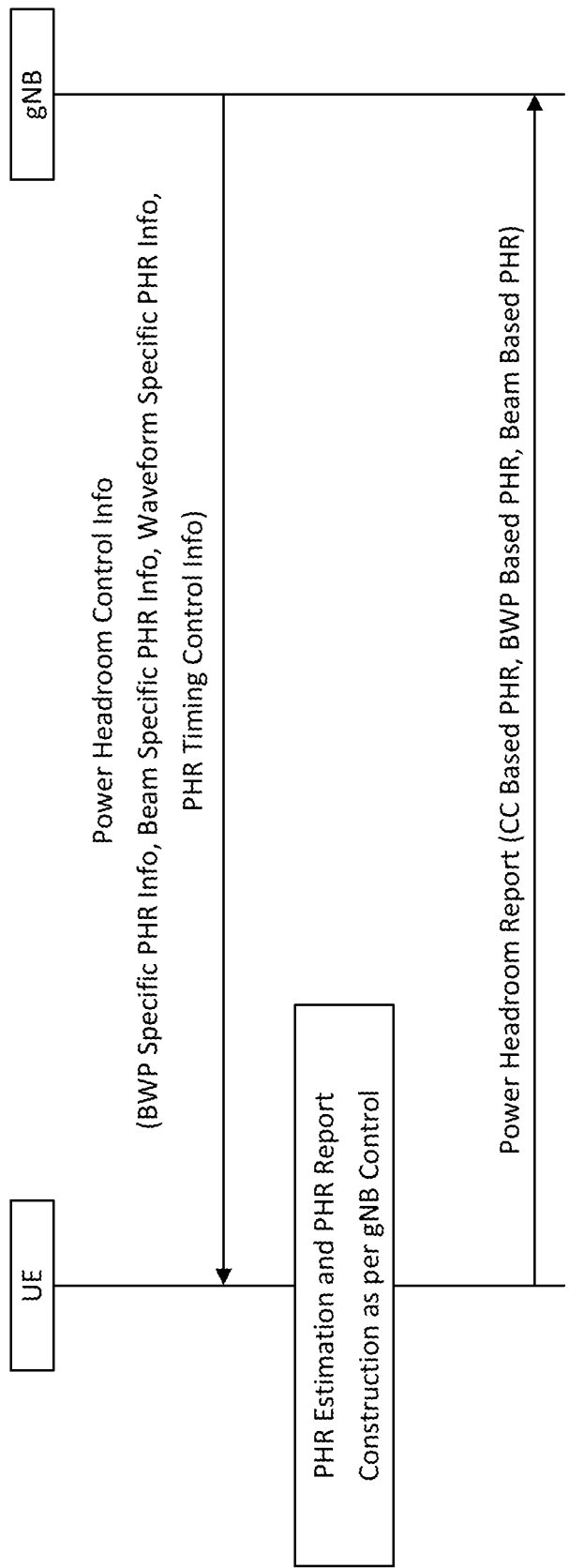
FIG. 14 shows a flow chart of an example method for Power Headroom Reporting Control by a gNB.

An example solution for Power Headroom Reporting is illustrated in FIG. 14.

As shown in FIG. 14, a method implemented by a device may comprise accessing power headroom control information; determining that one or more conditions for generating a power headroom report have been met; and generating, based on the determination, a bandwidth part (BWP) based power headroom report comprising one or more active BWP specific power headrooms of a serving cell. The method may further comprise reporting, based on the device reporting power headroom in a slot associated with a given numerology on a first cell that overlaps with a plurality of slots associated with a given numerology on a second cell, a power headroom report for a first slot of the plurality of slots associated with the given numerology on the second cell that fully overlaps with the slot associated with the given numerology on the first cell.

The device may be configured to set and report its configured maximum output power on a BWP basis. Determining that one or more conditions for generating a BWP based power headroom report have been met comprises determining that one or more of the following conditions have occurred: a phr-periodic timer has expired; a power headroom reporting functionality has been configured or reconfigured; a secondary cell of a MAC entity with configured uplink has been activated; a primary secondary cell has been added; a prh-prohibit timer has expired and one or more other conditions have occurred; and a BWP of a serving cell with configured uplink has been activated. The BWP based power headroom may be reported as a medium access control (MAC) control element identified by a MAC packet data unit subheader with a logical channel identifier that is specific to the power headroom reporting. The MAC control element may comprise an octet that indicates a BWP specific power headroom level of the serving cell and an octet that indicates a BWP specific maximum output power of the device that is used to calculate the BWP specific power headroom of the serving cell. The MAC control element may be an extended MAC control element configured to report a power headroom for a plurality of cells.

Solutions for UL BWP or group of UL BWPs specific transmit maximum power configuration by the gNB are discussed below.

In LTE, the parameter P-Max is signaled by the eNB to the UE and is used to limit the UE's uplink transmission power on a carrier frequency (see 3GPP TS 36.331). In NR, a component carrier may consist of multiple BWPs, and possibly more than one active BWP. Some of the BWPs within the component carrier may be close to each other while others might be separated by a much wider frequency separation, especially considering the fact that NR component carriers may be much wider bandwidth component carriers than that of LTE. When BWPs are very close to each other, they are likely to be served by the same PA or modeled as one LTE-like CC, while for BWPs with somewhat large frequency separation, these BWP may be handled by different PA or modelled as different LTE-like CC.

It is therefore proposed to define a new parameter P-Max,$_{BWP}$, that is a BWP or group of BWP specific P-Max, to limit the UE's uplink transmission power on a BandWidth Part (BWP) or a group of BWPs. The parameter P-Max,$_{BWP}$ uses a notation similar to that of parameter P-Max: the term in the parameter read as "'P' 'dash' 'Max'" rather than the expression "'P' 'minus' 'max'." For J BWPs, this requires J such values, denoted P-Max,$_{BWP}$(j) where j=1, 2, . . . J. Values of P-Max,$_{BWP}$(j) may be explicitly signaled to the UE by the gNB. Such signaled values e.g., P-Max,$_{BWP}$(j) may be signaled as an absolute value or may be signaled relative to P-Max(i) for example as a percentage or ratio of P-Max(i), or with an offset to P-Max(i). The same configuration value may be signaled for all P-Max,$_{BWP}$(j). When P-Max,$_{BWP}$(j) is signaled as a ratio or percentage of P-Max(j), the ratio may be a function of the number of active BWPs within the CC i. Additionally or alternatively, the UE may derive the value of P-Max,$_{BWP}$(j) from the value of P-Max(i). For example, the gNB may configure the UE with maximum power difference between any pair of active BWPs within the CC. The maximum power difference between any pair of active BWPs may be specified for example as per the UE capability, supported bandwidth or bandwidth combinations. The UE may then distribute the maximum output power between the active BWPs such that maximum power difference requirement is met.

In one embodiment, parameter P-Max,$_{BWP}$(j) may be defined relative to a reference P-Max value. Such reference P-Max value may be the carrier frequency level (e.g., CC level P-Max) or the P-Max value of another BWP considered as a reference BWP. When the parameter P-Max,$_{BWP}$(j) is defined relative to a reference P-Max value, the eNB may signal to the UE an offset (denoted here Offset-P-Max,$_{BWP}$(j)) for use by the UE to derive P-Max,$_{BWP}$(j) from the value of the reference P-Max.

The gNB may configure the UE with P-Max,$_{BWP}$(j) using common RRC signaling (e.g., SIB1, SIB3 or SIB5) or using dedicated RRC signaling.

The value of BWP specific maximum power P-Max,$_{BWP}$, may also be waveform dependent, since the parameter P-Max used to limit the UE's uplink transmit power on a carrier frequency may be waveform dependent. It has been agreed by RAN1 that NR UEs may support both DFT-S-OFDM and CP-OFDM waveforms. Because DFT-S-OFDM has lower PAPR than CP-OFDM, it can drive a UE's power amplifier to a higher operation point than CP-OFDM without creating Tx signal distortion issues. Therefore, CP-OFDM may be used when UE has spare power headroom to achieve high throughput, while DFT-S-OFDM may be used when UE becomes power limited. In addition to P-Max,$_{BWP}$ or P-Max,$_{BWP}$(j), the gNB may configure the UE with an offset P-MaxOffsetWF,$_{BWP}$ where the offset P-MaxOffsetWF,$_{BWP}$ is used to account for BWP specific maximum power differences between waveforms. Alternatively, offset P-MaxOffsetWF,$_{BWP}$ can be a fixed value in the specs for each carrier frequency. The DFT-S-OFDM waveform may be considered as a reference waveform. The UE may then determine P-Max,$_{BWP}$ for the CP-OFDM waveform as P-Max,$_{BWP}$ received from gNB minus P-MaxOffsetWF,$_{BWP}$. If individual P-Max,$_{BWP}$(j) are available for each BWP j, the UE may determine P-Max,$_{BWP}$(j) for CP-OFDM waveform as P-Max,$_{BWP}$(j) minus P-MaxOffsetWF,$_{BWP}$, or as P-Max,$_{BWP}$(j) minus P-MaxOffsetWF,$_{BWP}$(j) assuming individual offset parameter P-MaxOffsetWF,$_{BWP}$(j) is also available for each BWP j. In these examples, the offset is assumed to be a positive value. When the PHR setting is configured by the gNB, the virtual PHR may be configured as a power headroom value of a particular default waveform (e.g., DFT-S-OFDM). The UE can choose a waveform as a reference to report virtual PHR and may use 1 bit to indicate the reference waveform in virtual PHR.

The parameter P-Max for each carrier frequency may be adjusted in the UE to account for waveform differences. For example, assuming the DFT-S-OFDM is the reference waveform for UE configuration purposes. The UE determine P-Max for CP-OFDM waveform as P-Max received from gNB minus P-MaxOffsetWF. Similarly, if individual P-Max (j) are available for each carrier frequency j, the UE determines P-Max(j) for CP-OFDM waveform as P-Max(j) minus P-MaxOffsetWF, or as P-Max(j) minus P-MaxOffsetWF(j) assuming individual offset parameter P-MaxOffsetWF(j) is also available in the UE for each carrier frequency j. In these examples, the offset is assumed to be a positive value.

Solutions for UL beam or group of UL beams specific transmit maximum power configuration by the gNB are discussed below.

In LTE, the parameter P-Max is signaled by the eNB to the UE and is used to limit the UE's uplink transmission power on a carrier frequency (see 3GPP TS 36.331). In NR, transmissions involving wider beams (e.g., SSB based beam) as well as transmissions involving narrower beams (e.g., CSI-RS based beam), possibly with the same UE at the same time are being considered. Similarly, a UE may be configured with wide or narrow beams for UL transmissions and these beams may be subject to different allowed maximum outpower for better directional power control efficiency or for a better control of ACLR. In order to support beam or group beam specific P-Max, it is proposed to define a new parameter P-Max,$_{beam}$, to limit the UE's uplink transmission power on a beam or a group of beams. The parameter P-Max,$_{beam}$ uses a notation similar to that of parameter P-Max: the term in the parameter read as "'P' 'dash' 'Max'" rather than the expression "'P' 'minus' 'max'." For N beams, this requires N such values, denoted P-Max,$_{beam}$(n). P-Max,$_{beam}$(n) may be explicitly signaled to the UE by the gNB. Such signaled values P-Max,$_{beam}$(n) may be signaled as absolute values or may be signaled relative to P-Max(i) for example as a percentage or ratio of P-Max(i), or with an offset to P-Max(i). The same configuration value may be signaled for all P-Max,$_{beam}$(n). When P-Max,$_{beam}$(n) is signaled as a ratio or percentage of P-Max (i), the ratio may be a function of the number of serving beams within the CC i. The UE may derive the value of P-Max,$_{beam}$(n) from the value of P-Max(i). For example, the gNB may configure the UE with maximum power difference between any pair of beams within the UE or within a PA. Additionally or alternatively, the maximum power difference between any pair of serving beam may be specified as per the UE capability, supported bandwidth or bandwidth combinations. The UE then distributes the maximum output power between the serving beams such that maximum power difference requirement is met.

In one embodiment, parameter P-Max,$_{beam}$(j) may be defined relative to a reference P-Max value. Such reference P-Max value may be the carrier frequency level (e.g., CC level P-Max) or the P-Max value of a BWP considered as a reference BWP, or a P-Max value of a reference beam or a reference group of beams. When the parameter P-Max,$_{beam}$(j) is defined relative to a reference P-Max value, the eNB may signal to the UE an offset denoted here as Offset-P-Max,$_{beam}$(j) used by the UE to derive P-Max,$_{beam}$(j) from the value of the reference P-Max.

The gNB may configure the UE with P-Max,$_{beam}$(n) using common RRC signaling (e.g., SIB1, SIB3 or SIB5) or using dedicated RRC signaling.

The value of beam specific maximum power P-Max,$_{beam}$, may also be waveform dependent, since the parameter P-Max used to limit the UE's uplink transmit power on a carrier frequency may be waveform dependent. It is proposed that in addition to P-Max,$_{beam}$ or P-Max,$_{beam}$(j), the gNB configure the UE with an offset P-MaxOffsetWF,$_{beam}$ where the offset P-MaxOffsetWF,$_{beam}$ is used to account for beam specific maximum power differences between waveforms. For example, the DFT-S-OFDM waveform may be considered as a reference waveform. The UE then determines P-Max,$_{beam}$ for the CP-OFDM waveform as P-Max,$_{beam}$ received from gNB minus P-MaxOffsetWF,$_{beam}$. Similarly, if individual P-Max,$_{beam}$(j) are available for each beam j or group of beam j, the UE may determine P-Max,$_{beam}$(j) for CP-OFDM waveform as P-Max,$_{beam}$(j) minus P-MaxOffsetWF,$_{beam}$, or as P-Max,$_{beam}$(j) minus P-MaxOffsetWF,$_{beam}$(j) assuming individual offset parameter P-MaxOffsetWF,$_{beam}$(j) is also available for each beam j. In these examples, the offset is assumed to be positive value. When the PHR setting is configured by the gNB, the virtual PHR is configured as a power headroom value of a particular default waveform (e.g., DFT-S-OFDM). The UE may choose a waveform as reference to report virtual PHR, and may use 1 bit to indicate the reference waveform in virtual PHR.

Solutions for the control of BWP specific or group of BWPs specific configured transmit power reporting are discussed below.

In LTE, the UE is allowed to set its configured maximum output power $P_{CMAX,c}$ for serving cell c, where $P_{CMAX,c}$ is calculated using the parameter P-Max as specified in section 6.2.5 of 3GPP TS 36.101. It should be noted that the terms cell and component carrier may be used interchangeably.

The parameter $P_{CMAX,c}$ may be set by the UE within the acceptable maximum output power bounds taking into account several limitations of the UE transmission powers such as: P-Max signaled by the gNB to the UE to limit the UE's uplink transmit power on a carrier frequency, the UE power class and the maximum specified output power for the UE class, the allowed maximum power reduction (MPR) taking into account the modulation versus the channel bandwidth and transmission bandwidth, the allowed additional maximum power reduction (A-MPR) to account for ACLR (Adjacent Channel Leakage Ratio), spectrum emission and spurious emission requirements for carrier aggregation, the allowed maximum output power reduction (P-MPR$_c$) to ensure compliance with applicable electromagnetic energy absorption requirements and addressing unwanted emissions/self defense requirements in case of simultaneous transmissions on multiple RAT(s) for scenarios not in scope of 3GPP RAN specifications or to ensure compliance with applicable electromagnetic energy absorption requirements in case of proximity detection is used to address such requirements that require a lower maximum output power.

A new parameter $P_{CMAX,BWP}$ is defined that the UE is allowed to set as its configured maximum outpower for BWP in order to limit its maximum transmit output power on a given BWP. For example, assuming there are J active BWPs in the UE, there could be J $P_{CMAX,BWP}$(j) values set by the UE. The parameter $P_{CMAX,BWP}$(j) may be set by the UE, within the acceptable maximum output power bounds for the BWP(j) taking into account several limitations on the UE transmission powers such as one or more of the following: P-Max signaled by the gNB to the UE to limit the UE's uplink transmit power on a carrier frequency, the parameter P-Max,$_{beam}$ to take into account the maximum output power set by the gNB for the UL transmit beam or group of beams the transmission on the BWP is mapped to, the UE power class and the maximum specified output power for the UE class, the allowed maximum power reduction (MPR$_{BWP}$) taking into account the modulation versus the channel bandwidth and transmission bandwidth, the allowed additional maximum power reduction (A-MPR$_{BWP}$) to account for ACLR (Adjacent Channel Leakage Ratio), spectrum emission and spurious emission requirements for carrier aggregation, the allowed maximum output power reduction (P-MPR$_{BWP}$) to ensure compliance with applicable electromagnetic energy absorption requirements and addressing unwanted emissions/self defense requirements in case of simultaneous transmissions on multiple RAT(s) for scenarios not in scope of 3GPP RAN specifications or to ensure compliance with applicable electromagnetic energy absorption requirements in case of proximity detection is used to address such requirements that require a lower maximum output power.

Similar to the reporting of $P_{CMAX,c}$ in LTE to the eNB in order to help scheduling decision at the eNB, the UE may report $P_{CMAX,BWP}(j)$ to the gNB in order to help scheduling decisions in the gNB. For example, the UE may report $P_{CMAX,BWP}(j)$ for each active bandwidth part j to the gNB as part of PHR.

Solutions for the control of beam specific or group of beams specific configured transmit power reporting are discussed below.

Similar to the definition of $P_{CMAX,BWP}$ above, a new parameter $P_{CMAX,beam}$ that the UE is allowed to set as its configured maximum outpower for beam or group of beams in order to limit its maximum transmit output power on a given beam or group of beams, or in other words in order to limit the maximum transmit power under the coverage of a beam or group of beams, is disclosed. For example, assuming there are N serving paired beams or groups of serving paired beams in the UE, there could be N $P_{CMAX,beam}(n)$ values set by the UE. The parameter $P_{CMAX,beam}(n)$ may be set by the UE, within the acceptable maximum output power bounds for the beam n or group of beams n taking into account several limitations on the UE transmission powers such as one or more of the following: P-Max signaled by the gNB to the UE to limit the UE's uplink transmit power on a carrier frequency, the parameter P-Max,$_{beam}$(n) to take into account the maximum output power set by the gNB for the UL transmit beam or group of beams n, the UE power class and the maximum specified output power for the UE class, the allowed maximum power reduction (MPR$_{beam}$) taking into account the modulation versus the channel bandwidth and transmission bandwidth, the allowed additional maximum power reduction (A-MPR$_{beam}$) to account for ACLR (Adjacent Channel Leakage Ratio), spectrum emission and spurious emission requirements for carrier aggregation, the allowed maximum output power reduction (P-MPR$_{beam}$) to ensure compliance with applicable electromagnetic energy absorption requirements and addressing unwanted emissions/self defense requirements in case of simultaneous transmissions on multiple RAT(s) for scenarios not in scope of 3GPP RAN specifications or to ensure compliance with applicable electromagnetic energy absorption requirements in case of proximity detection is used to address such requirements that require a lower maximum output power.

Similar to the reporting of $P_{CMAX,c}$ in LTE to the eNB in order to help scheduling decision at the eNB, the UE may report $P_{CMAX,beam}(n)$ to the gNB in order to help scheduling decisions in the gNB. The UE may report $P_{CMAX,beam}(n)$ for each serving beam n or group of beams n to the gNB as part of PHR.

Solutions for the control of BWP or group of BWP specific power headroom reporting are discussed below.

It is proposed that the UE reports BWP specific PHR. The UE may report BWP specific PHR for each serving cell or component carrier (e.g., primary serving cell or secondary serving cell). The UE may report BWP specific PHR only for PCell (Primary Cell) or PSCell (Primary Secondary Cell). The UE may report BWP specific PHR only for PCell. In another embodiment, the UE may report BWP specific PHR only for PSCell. The UE may report BWP specific PHR only for secondary serving not configured as primary cell such as PSCell.

The gNB may configure the UE on whether the UE shall report BWP specific PHR for all serving cells, for PCell or PSCell, for only PCell, for only PSCell or for only SCells. Further the gNB may configure the UE to selectively report PHR for designated BWPs, whereby the gNB may implicitly derive from the reported BWP specific PHRs, PHRs for other BWPs.

For example, consider two BWPs (e.g., BWP k and BWP j). The UE may report BWP specific PHR for BWP j and the gNB implicitly derives the PHR of BWP k from the PHR of BWP j. A cluster of BWPs may be defined. Such cluster may be the set of BWPs of a CC, a subset of BWPs of a cell or CC or such cluster of BWPs may consist of BWPs that belongs to more than one cell or CC. A PHR reporting offset PHR$_{offset}$ may be defined. Such offset may be defined by cluster of BWPs or a single PHR$_{offset}$ for the UE may be defined for BWP specific PHR reporting.

The UE may report in reporting time interval i (e.g., subframe i), PHR for a BWP j part of a BWP cluster l, and the gNB may use the report PHR to implicitly derive the PHR of other BWPs k of the BWP cluster l that fulfils the condition |PHR$_{BWP}$(i,j)−PHR$_{BWP}$(i,k)|≤PHR$_{offset}$(l), where PHR$_{offset}$(l) denotes the PHR$_{offset}$ of cluster l.

The UE may report in a reporting period i a single PHR for a cluster of BWPs where the PHRs of all BWPs within the cluster fulfils the condition |PHR$_{BWP}$(i,j)−PHR$_{BWP}$(i,k)|≤PHR$_{offset}$(l), where PHR$_{offset}$(l) denotes the PHR$_{offset}$ defined for BWP cluster l, PHR$_{BWP}$(i,j) denotes PHR of BWP j in reporting time interval i and PHR$_{BWP}$(i,k) denotes PHR of BWP k in reporting time interval i.

The gNB may configure the UE with a cluster of BWPs for the purpose of BWP specific PHR reporting. The gNB may configure the UE with PHR$_{offset}$ or PHR$_{offset}$(l) for each cluster l of BWPs for the purpose of BWP specific PHR reporting.

The UE may dynamically create a cluster of BWPs for PHR reporting purposes based on the parameter PHR$_{offset}$. For example, the UE may determine the PHR for each BWP j, and then report one value of PHR e.g., PHR$_{BWP}$(i,l) per cluster l of BWPs, where the UE creates the cluster l of BWPs for PHR reporting purpose such that the condition |PHR$_{BWP}$(i,j)−PHR$_{BWP}$(i,k)|≤PHR$_{offset}$(l), is fulfilled for each reported PHR$_{BWP}$(i,l) of cluster l in PHR reporting time interval i and corresponding cluster l; where PHR$_{offset}$(l) denotes the PHR$_{offset}$ defined for BWP cluster l, PHR$_{BWP}$(i,j) denotes PHR of BWP j in reporting time interval i and PHR$_{BWP}$(i,k) denotes PHR of BWP k in reporting time interval i.

Solutions for the control of beam or group of beams specific power headroom reporting are discussed below.

The UE may report beam or group of beams specific PHR. The UE may report beam specific PHR for SSB beam or CSI-RS beam. The UE may separately report beam specific PHR for CSI-RS configured for RRM and for CSI-RS configured for beam management. The gNB may configure the UE to report beam specific PHR only for SSB beams. The gNB may configure the UE to report beam specific PHR only for CSI-RS beams. The gNB may configure the UE to report PHR for CSI-RS configured for RRM or for CSI-RS configured for beam management.

The UE may report beam specific PHR for each serving cell or component carrier (e.g., primary serving cell or secondary serving cell). The UE may report beam specific PHR only for PCell (Primary Cell) or PSCell (Primary Secondary Cell). The UE may report beam specific PHR only for PCell. The UE may report beam specific PHR only for PSCell. The UE may report beam specific PHR only for secondary serving not configured as primary cell such as PSCell.

The gNB may configure the UE on whether the UE shall report beam or group of beams specific PHR for all serving cells, for PCell or PSCell, for only PCell, for only PSCell or for only SCells.

Further the gNB may configure the UE to selectively report PHR for designated beams whereby the gNB may implicitly derive from the reported beam specific PHRs, PHRs for other beams.

For example, consider two beams (e.g., beam k and beam j). The UE may report beam specific PHR for beam j and the gNB implicitly derives the PHR of beam k from the PHR of beam j. A cluster of beams may be defined. The cluster may be the set or subset of UL beams in paired (UL, DL) beams, where the DL beams belong to the same cell or CC. The cluster may be the set or subset of UL beams in paired (UL, DL) beams, where the DL beams belong to the different cells or CCs. The cluster of beams may be defined such that the cluster consists of the set or subset of UL beams in paired (UL, DL) beams, where the DL beams belong to the same BWP. The cluster may be formed such that the cluster consists of the set or subset of UL beams in paired (UL, DL) beams, where the DL beams may belong to different DL BWPs. The cluster of UL beams may be defined such that the beams are mapped to the same PA or alternatively the beams are map to different PAs.

A PHR reporting offset $PHR_{offset}$ may be defined. Such offset may be defined by cluster of beams or a single $PHR_{offset}$ for the UE may be defined for beam specific PHR reporting.

The UE may report in reporting time interval i (e.g., subframe i), PHR for a beam j or group of beams j part of a beam cluster l, and the gNB use the report PHR to implicitly derive the PHR of other beams k of groups of beam k within the beam cluster l, that fulfils the condition $|PHR_{beam}(i,j)-PHR_{beam}(i,k)| \leq PHR_{offset}(l)$, where $PHR_{offset}(l)$ denotes the $PHR_{offset}$ of cluster l.

For example, the UE may report in a reporting period i a single PHR for a cluster of beams where the PHRs of all beams within the cluster fulfils the condition $|PHR_{beam}(i,j)-PHR_{beam}(i,k)| \leq PHR_{offset}(l)$, where $PHR_{offset}(l)$ denotes the $PHR_{offset}$ defined for beam cluster l, $PHR_{beam}(i,j)$ denotes PHR of beam j or group of beams j in reporting time interval i and $PHR_{beam}(i,k)$ denotes PHR of beam k or group of beams k in reporting time interval i.

The gNB may configure the UE with a cluster of beams or group of beams for the purpose of beam specific PHR reporting. The gNB may configure the UE with $PHR_{offset}$ or $PHR_{offset}(l)$ for each cluster l of beams for the purpose of beam specific PHR reporting.

The UE may dynamically create a cluster of beams for PHR reporting purpose based on the parameter $PHR_{offset}$. The UE may determine the PHR for each beam j or group of beams j, and then report one value of PHR (e.g., $PHR_{beam}(i,l)$) per cluster l of beams, where the UE creates the cluster l of beams for PHR reporting purpose such that the condition $|PHR_{beam}(i,j)-PHR_{beamP}(i,k)| \leq PHR_{offset}(l)$ is fulfilled for each reported $PHR_{beam}(i,l)$ of cluster l in PHR reporting time interval i and corresponding cluster l; where $PHR_{offset}(l)$ denotes the $PHR_{offset}$ defined for beam cluster l, $PHR_{beam}(i,j)$ denotes PHR of beam j in reporting time interval i and $PHR_{beam}(i,k)$ denotes PHR of beam k in reporting time interval i.

Solutions to account for impact of transmission waveform differences in power headroom reporting are discussed below.

The value of carrier frequency maximum power P-Max, or BWP specific maximum power $P\text{-}Max_{,BWP}$, or beam specific maximum power $P\text{-}Max_{,beam}$, may be waveform dependent. It has been agreed by RAN1 that NR UEs may support both DFT-S-OFDM and CP-OFDM waveforms. It should also be noted that, because DFT-S-OFDM has lower PAPR than CP-OFDM, it can drive UE's power amplifier to higher operation point than CP-OFDM, without creating Tx signal distortion issues. Therefore, CP-OFDM may be used when a UE has spare power headroom to achieve high throughput, while DFT-S-OFDM is used when the UE becomes power limited. However, since the gNB and UE need to know what waveform is used for specific transmission so the data can be properly decoded and processed in the gNB, the gNB and the UE need to coordinate the timing of waveform switching. This can be through semi-static signaling (RRC signaling or MAC CE signaling) or dynamic signaling for example PHY DCI signaling including DCI with UL grant allocation. However, there might still be situation where there is confusion between gNB and UE regarding which waveform is selected for a specific transmission. One such situation might be the scenario with overlapping UL grant resources in time which each UL grant configured to use a specific waveform and there are logical channels which may be served by either of the grant. Unless specific Logical Channel Prioritization rules are specified so the gNB knows exactly how the grant are used, there might be a miss match between the UE and the gNB in terms of the assumed waveform used. One can argue that the gNB may perform some form of blind decoding of the received data for example some form of try and error on the used wave form by the UE. However, if PHR is received during this period, there might be some uncertainty on the waveform used for the PHR calculation. Another scenario might be the case of virtual PHR where there is no actual UL data transmission taking place from the UE to the gNB. In this scenario, it might be useful for the UE to report to the gNBs, the waveform that is assumed for the reported PHR (e.g., cell or component carrier level PHR, beam specific PHR or BWP specific PHR), or for the reported configured maximum output power (e.g., cell or component carrier level maximum output power $P_{CMAX,c}$, BWP specific configured maximum output power $P_{CMAX,BWP}$, beam specific configured maximum output power $P_{CMAX,beam}$).

Solutions to the problem of power headroom timing considerations and impact to power headroom reporting for non-overlapping grants is discussed below.

The time interval of the PHR estimation may be the transmission duration of the grant carrying the PHR MAC CE. Considering slot level scheduling, transmission occasion is a slot.

For real PHR, the time interval of the PHR estimation may be the transmission duration of the MAC PDU that includes the MAC SDU multiplexed with the PHR MAC CE, (e.g., the duration of the slot or the duration of the mini-slot or the duration of the set of symbols over which the MAC PDU carrying the MAC SDU multiplexed with the PHR MAC CE is transmitted).

Even for NR single carrier operation, virtual PHR may be reported. For example, when at least two BWPs of the same cell or component carriers are active, real PHR may be reported for a BWP with actual transmission while virtual PHR may be reported for a BWP with no actual transmission in a given PHR estimation time interval. Similarly, in the case of beam specific PHR, virtual beam specific PHR may be used. Virtual PHR may be reported for beams while real PHR are reported for other beams.

For virtual PHR, the time interval of the PHR estimation is the duration of the slot or the duration of the mini-slot or the duration of the set of symbols over which the MAC PDU carrying the PHR MAC CE is transmitted.

The PHR may be estimated close to the time of the transmission of the MAC PDU after completion of logical channel prioritization procedure to increase the accuracy of the reported PHR. A PHR calculated too early before transmission of the MAC PDU carrying the PHR MAC CE might be erroneous if a grant with an earlier transmission time than the assumed UL grant for the already constructed the PHR MAC CE.

Figure 2:
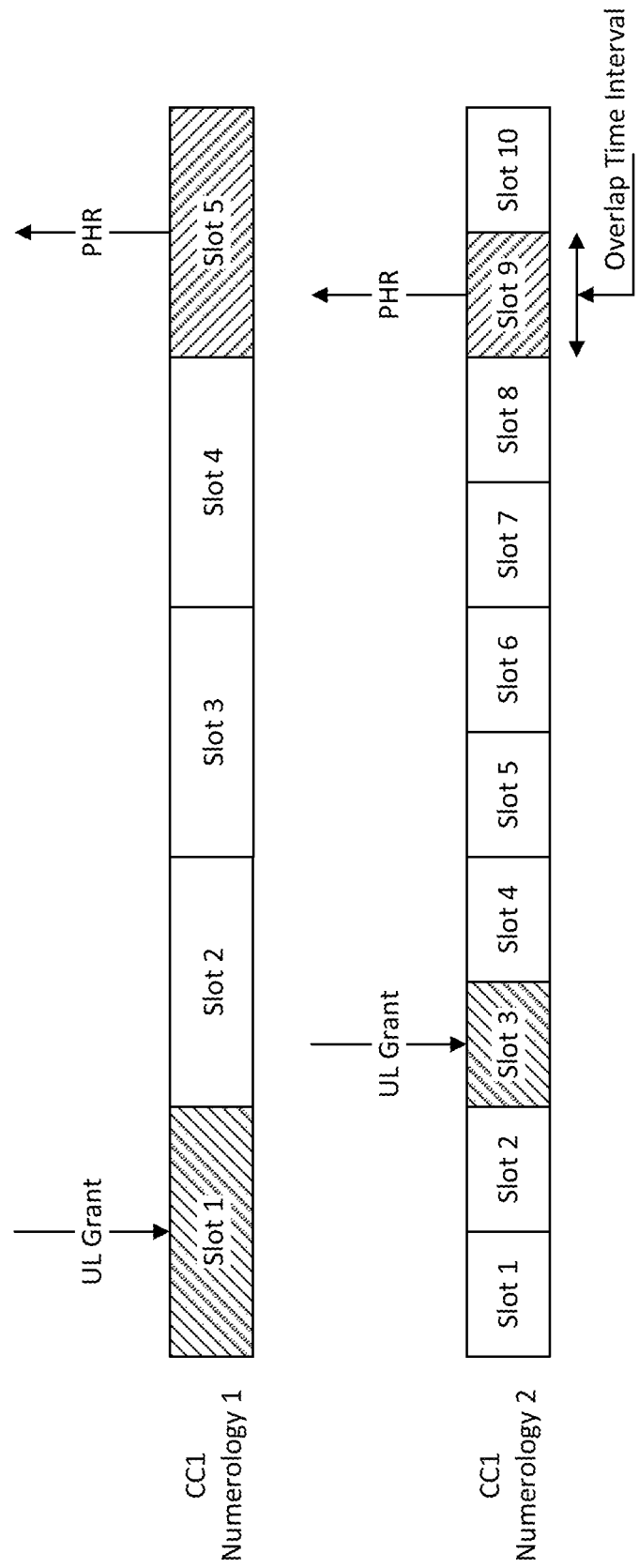
FIG. 2 shows an example block diagram of single CC PHR reporting with PHR estimation time interval overlap.

Solutions to the problem of power headroom timing considerations and impact to power headroom reporting for overlapping grants within the same cell or component carrier use cases as illustrated by FIG. 2 are discussed below.

Assuming conditions for power headroom reporting are fulfilled, the time interval of the PHR estimation may be the short transmission time duration represented by slot 9 (e.g., the first slot of the multiple slots associated with numerology 2 that fully overlaps with the slot associated with numerology 1) or slot 10 (e.g., virtual PHR on numerology 2) or the long transmission time duration represented by slot 5 or the non-overlapping time interval difference between the long transmission time interval represented by slot 5 and the short transmission time interval represented by slot 9, that is the slot 10. The UE may use one or more time intervals for PHR estimation. Which time interval(s) to use for power headroom estimation may be predefined. The gNB may configure the UE with which time interval(s) to use for power headroom estimation. Another related issue is which grant is used for the reporting of the estimating power headroom and what type of PHR is reported. The following options may be considered:

Power headroom may be reported with the grant of shorter transmission duration with real transmission represented in the example of FIG. 2 by slot 9. In this case, the UE may report both real PHR and virtual PHR even for a single CC case. The may report one single real PHR value for this CC (e.g., CC1 in the example illustrated by FIG. 2). The single real PHR value may take into account transmit power for transmissions on both numerology 1 and numerology 2. The single real PHR may take into account only transmission on numerology 2. The UE may report real PHR for some BWPs and virtual PHR for other BWPs. The BWP specific real PHR may take into account transmission on both numerology 1 and numerology 2 or may be numerology specific. Similarly, the BWP specific virtual PHR may take into account transmission on both numerology 1 and numerology 2 or may be numerology specific virtual PHR. The UE may report real PHR for some beams and virtual PHR for some other beams. The beam specific real PHR may take into account transmission on both numerology 1 and numerology 2 or may be numerology specific. The beam specific virtual PHR may take into account transmission on both numerology 1 and numerology 2 or may be numerology specific virtual PHR.

Power headroom may be reported with the grant of longer transmission duration represented in the example of FIG. 2 by slot 5. In this case, the UE may report both real PHR and virtual PHR even for a single CC case. The UE may report one single real PHR value for this CC (e.g., CC1 in the example illustrated by FIG. 2). The single real PHR value may take into account transmit power for transmissions on both numerology 1 and numerology 2. The UE may report virtual PHR for numerology 2, estimated over the slot 10 time interval. The UE may report real PHR for numerology 1 and may report for numerology 2, virtual PHR estimated over the slot 10 time interval. For numerology 1, the UE may report real PHR for some BWPs and virtual PHR for other BWPs. For numerology 1, the UE may report real PHR for some beams and virtual PHR for some other beams. The UE may report for numerology 2, real PHR for some BWPs and virtual PHR for other BWPs. For numerology 2, the UE may report real PHR for some beams and virtual PHR for some other beams.

Power headroom may be reported using the grant with the earliest assignment time (e.g., the grant with numerology 1). The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant.

Power headroom may be reported using the grant with the later assignment time e.g., the grant with numerology 2. The grant transmission time duration may be the shorter transmission duration in which case the UE behaves for PHR transmission using shorter transmission duration grant. The grant transmission time duration may be the longer transmission duration in which case the UE behaves as per the embodiments described above for PHR transmission using longer transmission duration grant as described above.

Power headroom may be reported using the grant with the latest transmission time (e.g., the grant with numerology 1 in the example of FIG. 2). The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant.

Power headroom may be reported using the grant with the earliest transmission time (e.g., the grant with numerology 2 in the example of FIG. 2). The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant.

The UE may decide on which grant to use for the PHR based on the result of logical channel prioritization procedure. For example, the outcome of the LCP procedure may dictate that the PHR is transmitted on the grant with the earliest transmission time, or the outcome of the LCP procedure may dictate that the PHR is transmitted on the grant with the latest transmission time. The LCP may dictate that the PHR is transmitted using the shorter transmission duration grant. The LCP procedure may dictate that the PHR is transmitted on the longer transmission duration grant.

One or more of the rules described above may be specified (e.g., predefined) to control the UE behavior. Additionally or alternatively, the gNB may configure the UE on which grant to use for the transmission of the PHR.

An additional issue when the PHR is reported with an overlapping grant with earlier transmission time while there is another overlapping grant with a later transmission time is whether the periodicPHT-Timer and/or the prohibitPHT-Timer may be started or re-started, or whether all triggered PHR(s) are cancelled. In one embodiment, it is proposed that when the UE reports the PHR using an overlapping grant with earlier transmission time while there is an overlapping grant of later transmission time, the periodicPHT-Timer and/or prohibitPHT-Timer are not restarted and the triggered PHR(s) or at least some triggered PHR are not cancelled. The periodicPHT-Timer and/or the prohibitPHT-Timer may be started or re-started and all triggered PHR(s) may be cancelled by the UE at the end of transmission with the grant with the latest transmission time. In the example of FIG. 2, the periodicPHT-Timer and/or the prohibitPHT-Timer may be started or re-started and all triggered PHR(s) may be cancelled at the end of slot 5.

Solutions to the problem of power headroom timing considerations and impact to power headroom reporting for overlapping grants within different cells or component carriers in reference to the exemplary scenarios described collectively in FIGS. 3-7 are discussed below.

Assuming conditions for power headroom reporting are fulfilled, the time interval of the PHR estimation may be one or more of the following:

The short transmission time duration represented for example by slot 7 in FIG. 3 or slot 9 in FIG. 4, e.g., the first slot of the multiple slots associated with numerology of cell 2 that fully overlaps with the slot associated with numerology of cell 1 or slot 9 in FIG. 5;

The long transmission time duration represented for example by slot 5 in either FIG. 3, FIG. 4 or FIG. 5;

The non-overlapping time interval difference, between the long transmission time interval represented by slot 5 and the short transmission time interval represented by slot 9, that is the slot 10 in FIG. 4 or FIG. 5; and/or The total contiguous transmission duration (e.g., the sum of the short transmission duration and the long transmission duration minus the overlap between the long and the short transmission duration).

The UE may use one or more time intervals for PHR estimation. Which time interval(s) to use for power headroom estimation may be specified (e.g., predefined). The gNB may configure the UE with which time interval(s) to use for power headroom estimation. Another related issue is which grant is used for the reporting of the estimating power headroom and what type of PHR is reported. The following options may be considered:

Power headroom may be reported with the grant of shorter transmission duration with real transmission represented in the example of FIG. 3 by slot 7, and slot 9 in FIG. 4 or FIG. 5. In this case, the UE may report both real PHR and virtual PHR. Any of the real PHR or virtual PHR reporting embodiments described herein also applies for each of the component carriers depicted in the scenarios considered herein. Furthermore, in the scenario depicted in FIG. 3, the UE may report real PHR in slot 7 for CC2 and virtual PHR in slot 4 for CC1. Furthermore, it is proposed to introduce a fractional PHR where the reported PHR may be estimated over a fraction of a transmission slot. For example, in the case of FIG. 3, the virtual PHR reported for CC1 may be estimated over half of slot 4;

Power headroom may be reported with the grant of longer transmission duration represented by slot 5 in any of the scenarios depicted in FIG. 3, FIG. 4 or FIG. 5. In this case, the UE may report both real PHR and virtual PHR. Any of the real PHR or virtual PHR reporting embodiments described herein also applies for each of the component carriers depicted in the scenarios considered here. The UE may report a real PHR value for CC1 as well as real PHR for CC2. For example, considering the scenario in FIG. 4 or FIG. 5, the UE may report real PHR for CC1 and also real PHR for CC2 where the real PHR for CC2 is estimated over slot 9. The UE may report real PHR for CC1 and virtual PHR for CC2 where the virtual PHR is estimated over example over slot 9 or slot 10 in the example of FIG. 3, or over slot 10 in the example of FIG. 4 or FIG. 5;

Power headroom may be reported using the grant with the earliest assignment time. The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant;

Power headroom may be reported using the grant with the later assignment time. The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant;

Power headroom may be reported using the grant with the latest transmission. The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant; and Power headroom may be reported using the grant with the earliest transmission time. The grant transmission time duration may be the shorter transmission duration in which case the UE behaves for PHR transmission using shorter transmission duration grant. The grant transmission time duration may be the longer transmission duration in which case the UE behaves for PHR transmission using longer transmission duration grant.

The UE may decide on which grant to use for the PHR based on the result of logical channel prioritization procedure. For example, the outcome of the LCP procedure may dictate that the PHR is transmitted on the grant with the earliest transmission time, or the outcome of the LCP procedure may dictate that the PHR is transmitted on the grant with the latest transmission time. The LCP may dictate that the PHR is transmitted using the shorter transmission duration grant, or the LCP procedure may dictate that the PHR is transmitted on the longer transmission duration grant.

One or more of the rules described above may be specified (e.g., predefined) to control the UE behavior. The gNB may configure the UE on which grant to use for the transmission of the PHR.

An additional issue when the PHR is reported with an overlapping grant with earlier transmission time while there is another overlapping grant with a later transmission time is whether periodicPHT-Timer and/or the prohibitPHT-Timer may be started or re-started, or whether all triggered PHR(s) are cancelled. In one embodiment, it is proposed that when the UE reports the PHR using an overlapping grant with earlier transmission time while there is an overlapping grant of later transmission time, the periodicPHT-Timer and/or the prohibitPHT-Timer are not restarted and the triggered PHR(s) or at least some triggered PHR are not cancelled. The periodicPHT-Timer and/or the prohibitPHT-Timer may be started or re-started and all triggered PHR(s) may be cancelled by the UE at the end of transmission with the grant with the latest transmission time. The periodicPHT-Timer and/or the prohibitPHT-Timer may be started or re-started and all triggered PHR(s) may be cancelled at the end of slot 5.

Solutions for new power headroom events in NR are discussed below.

It is proposed that a Power Headroom Report (PHR) may be triggered in any of the following new events in addition or alternatively to the existing LTE PHR triggering events:

prohibitPHR-Timer expires or has expired and the path loss has changed more than dl-dB PathlossChangeCSI-RS for at least one serving CSI-RS based beam of any MAC entity which is used as a pathloss reference since the last transmission of a PHR in this MAC entity when the MAC entity has UL resources for new transmission, where PathlossChangeCSI-RS is a newly defined pathloss threshold for PHR control;

prohibitPHR-Timer expires or has expired and the path loss has changed more than dl-PathlossChangeCSI-RS dB for at least one group of serving CSI-RS of any MAC entity which is used as a pathloss reference since the last transmission of a PHR in this MAC entity when the MAC entity has UL resources for new transmission;

prohibitPHR-Timer expires or has expired and the path loss has changed more than dl-PathlossChangeCSI-RS dB for at least one activated Serving Cell of any MAC entity which is used as a pathloss reference since the last transmission of a PHR in this MAC entity when the MAC entity has UL resources for new transmission;

prohibitPHR-Timer expires or has expired and the path loss has changed more than dl-PathlossChangeSSB dB for at least one serving SSB based beam of any MAC entity which is used as a pathloss reference since the last transmission of a PHR in this MAC entity when the MAC entity has UL resources for new transmission, where PathlossChangeSSB is a newly defined pathloss threshold for PHR control;

prohibitPHR-Timer expires or has expired and the pathloss has changed more than dl-PathlossChangeSSB dB for at least one group of serving SSB of any MAC entity which is used as a pathloss reference since the last transmission of a PHR in this MAC entity when the MAC entity has UL resources for new transmission;

prohibitPHR-Timer expires or has expired and the path loss has changed more than dl-PathlossChangeSSB dB for at least one activated Serving Cell of any MAC entity which is used as a pathloss reference since the last transmission of a PHR in this MAC entity when the MAC entity has UL resources for new transmission;

Activation of a BWP of a serving cell of any MAC entity with configured uplink. For example, assuming the gNB configures the UE with group of BWPs specific P-MAX (e.g., $P_{CMAX,BWP}$) within a CC, then upon activation of a BWP from such group of BWPs, where the activated BWP part is the first BWP to be activated, PHR may be triggered; Similarly, assuming the gNB configured the UE with $P_{CMAX,BWP}$ specific to one BWP, then upon activation of that BWP, PHR may be triggered; and A beam becomes a serving beam of any MAC entity with configured uplink. For example, considering a scenario where the gNB configures the UE with group of beams specific $P_{CMAX,beam}$ within a cell, then upon a beam from this group becoming a serving beam and that beam is the first beam from this group of beams to be activated, PHR may be triggered; Similarly, assuming the gNB configured the UE with $P_{CMAX,beam}$ specific to one beam, then upon activation of that beam, PHR may be triggered.

It is further proposed to define a new prohibit power headroom reporting timer prohibitBwpPHR-Timer, and a new periodic PHR timer periodicBwpPHR-Timer for BWP based PHR reporting. For example, the new events defined above that makes uses of prohibitPHR-Timer may be based on BWP specific timer prohibitBwpPHR-Timer. A new event may be defined as follows: BWP based PHR is triggered if periodicBwpPHR-Timer expires.

It is further proposed to define new prohibit power headroom reporting timer prohibitBeamPHR-Timer and new periodic PHR timer periodicBeamPHR-Timer for beam based PHR reporting. For example, the new beam related events defined may be controlled by beam specific timer PHR reporting timers such as prohibitBeamPHR-Timer and periodicBeamPHR-Timer. Furthermore, a new event may be defined as follows: beam based PHR is triggered if periodicBeamPHR-Timer expires.

Exemplary solutions for detailed design of power headroom report MAC control element are discussed below.

New Power headroom report MAC control elements in support of BWP or group of BWPs based power headroom reporting are disclosed herein. New Power headroom report MAC control elements in support of beam or group of beams based power headroom reporting are also disclosed.

Two new types of PHR MAC CE in support of BWP based power headroom reporting are disclosed by way of example of BWP based PHR.

The first type is illustrated in FIG. 8, and denoted herein as bwpPHR for reporting power headroom for BWP within one cell or CC. It is proposed to define a new LCID in support of bwpPHR MAC control element. It is further proposed that the PHR MAC control element is identified by a MAC PDU subheader with a new LCD that is specific to this new bwpMAC control element. The bwpPHR MAC CE has variable size. When Type 2 PH is reported, the octet containing the Type 2 PH field is included first after the octet indicating the presence of PH per BWP and followed by an octet containing the associated $P_{CMAX,BWP}$ field (if reported). Then follows an octet with the Type 1 PH field and an octet with the associated $P_{CMAX,BWP}$ field (if reported), for the Primary BWP (PBWP). And then follows in ascending order based on the ServBWPIndex an octet with the Type x PH field, wherein x is equal to 1 or 3. The term PBWP is used to denoted the default BWP of the PCell, which in this example may be configured with PUCCH. The PBWP related PH fields and $P_{CMAX,BWP}$ field may only be present if the PHR is being reported for a primary cell or primary CC. The term ServBWPIndex denotes other BWPs within the cell or CC other than the PBWP. The bwpPHR MAC CE may be used to report PHR for up to six BWPs within a cell or CC. When the cell or CC is not the primary cell or CC, the bwpPHR MAC CE may be used to report PHR for up to five BWPs within a cell or CC.

Another variant of bwpPHR MAC control element is illustrated in FIG. 9. The bwpPHR may be used to report power headroom for BWP within one cell or CC other than a primary cell or CC (e.g., a secondary serving cell). The octet indicating the presence of PH per BWP is first, then follows in ascending order based on the ServBWPIndex an octet with the Type x PH field, wherein x is equal to 1, 2 or 3. The bwpPHR MAC CE may be used to report PHR for up to six BWPs within a secondary serving cell or CC. The cell or component carrier over which the bwpPHR MAC CE is received in gNB corresponds to the cell or component carrier for which PHR is being reported. Therefore, the gNB implicitly derives the cell or component carrier the received bwpPHR MAC CE corresponds to, based on the cell or component carrier on which the report is received.

The second type of PHR MAC CE in support of BWP or group of BWPs based PHR reporting is illustrated in FIG. 10 and denoted extendedbwpPHR. It is used to report BWP based power headroom for up to eight cells or CCs. It is proposed to define a new LCID in support of extendedbwpPHR MAC control element. It is further proposed that the extended BWP based Power Headroom Report (PHR) MAC control elements extendedbwpPHR is identified by a MAC PDU subheader with the newly defined LCID that is specific to this new extendedbwpPHR MAC control element. The extendedbwpPHR has variable size. One octet with C fields is used for indicating the presence of PH per reported serving cell (SCell). When Type 2 PH is reported for the PCell, the octet containing the Type 2 PH field of the primary BWP (PBWP) of the PCell is included first after the octet(s) indicating the presence of PH per SCell and per BWP, followed by an octet containing the associated $P_{CMAX,BWP}$ field (if reported) of the PBWP. Then follows the Type 2 PH field for the PUCCH BWP of the PUCCH SCell denoted PUCCH SBWP in this example (if PUCCH on SCell is configured and Type 2 PH is reported for the PUCCH SCell), followed by an octet containing the associated $P_{CMAX,BWP}$ field (if reported). Then follows an octet with the Type 1 PH field and an octet with the associated $P_{CMAX,BWP}$ field (if reported), for the PBWP of the PCell. Then follows in ascending order based on the ServBWPIndex an octet with the Type x PH field, wherein, x is equal to 1 or 3, and an octet with the associated $P_{CMAX,BWP}$ field (if reported), for each BWP of the reported secondary cell. In this example, PBWP related PH fields and $P_{CMAX,BWP}$ fields may only be present if the PHR is being reported for a primary cell or primary CC. Similarly, SBWP related PH field and $P_{CMAX,BWP}$ fields may only be present if the PHR is being reported for a PUCCH secondary cell (SCell). As illustrated in FIG. 10, the PHR MAC CE extendedbwpPHR can be used to report BWP based PHR for one primary cell and up to 7 serving cells or CC. In this example, PHR can be reported for up to four BWPs for the primary cell and the PUCCH secondary cell while PHR may be reported for up to three BWPs per other reported secondary cells. The example here also assumes in cell group, PUCCH resources may be configured for the primary cell and one additional SCell like in LTE. However, in NR it is possible that PUCCH resources are allocated on any secondary cell within a cell group. Therefore, for the reported Type x PH as illustrated in FIG. 10, x may also take the value 2.

The details of the newly proposed PHR MAC Control Elements are defined as follows:

$C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2 and Type 3 PH, V=0 indicates the presence of the octet containing the associated $P_{CMAX,BWP}$ field, and V=1 indicates that the octet containing the associated $P_{CMAX,BWP}$ field is omitted;

Power Headroom (PH): this field indicates the power headroom level. The length of the field is 6 bits. The reported PH and the corresponding power headroom levels are shown in Table 1. An example of corresponding measured values in dB is illustrated in Table 2.

P: this field indicates whether the MAC entity applies power backoff due to power management as allowed by P-MPR$_{BWP}$. The MAC entity may set P=1 if the corresponding $P_{CMAX,BWP}$ field would have had a different value if no power backoff due to power management had been applied;

$P_{CMAX,BWP}$: if present, this field indicates the maximum UE configured transmit power and used for calculation of the preceding PH field. The reported $P_{CMAX,BWP}$ and the corresponding nominal UE transmit power levels are shown Table 3 and Table 4 respectively.

TABLE 1

Power Headroom Level for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 2

Power headroom report mapping

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

TABLE 3

Nominal UE Configured transmit power level

| $P_{CMAX}$ | Nominal UE transmit power level |
|---|---|
| 0 | PCMAX_00 |
| 1 | PCMAX_01 |
| 2 | PCMAX_02 |
| ... | ... |
| 61 | PCMAX_61 |
| 62 | PCMAX_62 |
| 63 | PCMAX_63 |

TABLE 4

Mapping of $P_{CMAX}$

| Reported value | Measured quantity value | Unit |
|---|---|---|
| PCMAX_00 | $P_{CMAX} < -29$ | dBm |
| PCMAX_01 | $-29 \leq P_{CMAX} < -28$ | dBm |
| PCMAX_02 | $-28 \leq P_{CMAX} < -27$ | dBm |
| ... | ... | ... |
| PCMAX_61 | $31 \leq P_{CMAX} < 32$ | dBm |
| PCMAX_62 | $32 \leq P_{CMAX} < 33$ | dBm |
| PCMAX_63 | $33 \leq P_{CMAX}$ | dBm |

Two new types of PHR MAC CE in support of beam based power headroom reporting are proposed by way of example of beam based PHR.

The first type is illustrated in FIG. 11 and denoted herein as beamPHR for reporting power headroom for beams within one cell or CC. It is proposed to define a new LCID in support of beamPHR MAC control element. It is further proposed that the PHR MAC control element is identified by a MAC PDU subheader with a new LCID that is specific to this new beamMAC control element. The beamPHR MAC CE has variable size. When Type 2 PH is reported, the octet containing the Type 2 PH field is included first after the octet indicating the presence of PH per beam (B) and followed by an octet containing the associated $P_{CMAX,B}$ field (if reported). Then follows an octet with the Type 1 PH field and an octet with the associated $P_{CMAX,B}$ field (if reported), for the Primary Beam (PB). And then follows in ascending order based on the ServBeamIndex an octet with the Type x PH field, wherein x is equal to 1 or 3. The terms Primary Beam (PB) may be used to denoted the beam paired with the beam carrying Downlink control information or the beam carrying Uplink control information including PUCCH. The terms PB related PH fields and $P_{CMAX,B}$ field may only be present if the PHR is being reported for a primary cell or primary CC. The term ServbeamIndex denotes other beams within the cell or CC other than the PB. The beamPHR MAC CE may be used to report PHR for up to six beams or group of beams within a cell or CC. When the cell or CC is not primary cell or CC, the bwpPHR MAC CE may be used to report PHR for up to five beams within a cell or CC.

Another variant of beamPHR MAC control element is illustrated in FIG. 12. In this example, it is assumed that the beamPHR is used to report power headroom for beams within one cell or CC other than a primary cell or CC (e.g., a secondary serving cell). The octet indicating the presence of PH per BWP is first, then follows in ascending order based on the ServBIndex an octet with the Type x PH field, wherein x is equal to 1, 2 or 3. In this example, the beamPHR MAC CE may be used to report PHR for up to six beams within a secondary serving cell or CC. The cell or component carrier over which the beamPHR MAC CE is received in gNB corresponds to the cell or component carrier for which PHR is being reported. Therefore, the gNB implicitly derives the cell or component carrier the received beamPHR MAC CE corresponds to based on the cell or component carrier on which the report is received.

The second type of PHR MAC CE in support of beams or group of beams based PHR reporting is illustrated in FIG. 13 and denoted extendedbeamPHR. It is used to report beam based power headroom for up to eight cells or CCs. It is proposed to define a new LCID in support of extendedbeamPHR MAC control element. It is further proposed that the extended beam based Power Headroom Report (PHR) MAC control elements extendedbeamPHR is identified by a MAC PDU subheader with the newly defined LCID that is specific to this new extendedbeamPHR MAC control element. The extendedbeamPHR has variable size. One octet with C fields is used for indicating the presence of PH per reported serving cell (SCell). When Type 2 PH is reported for the PCell, the octet containing the Type 2 PH field of the Primary Beam (PB) of the PCell is included first after the octet(s) indicating the presence of PH per SCell and per beam or group of beams, followed by an octet containing the associated $P_{CMAX,beam}$ field (if reported) of the PB. Then follows the Type 2 PH field for the PUCCH beam or group of beams of the PUCCH SCell denoted PUCCH SB in this example (if PUCCH on SCell is configured and Type 2 PH is reported for the PUCCH SCell), followed by an octet containing the associated $P_{CMAX,beam}$ field (if reported). Then follows an octet with the Type 1 PH field and an octet with the associated $P_{CMAX,beam}$ field (if reported), for the PB of the PCell. Then follows in ascending order based on the ServBeamIndex an octet with the Type x PH field, wherein, x is equal to 1 or 3, and an octet with the associated $P_{CMAX,beam}$ field (if reported), for each beam or group of beams of the reported secondary cell.

In this example, PB related PH fields and $P_{CMAX,beam}$ fields may only be present if the PHR is being reported for a primary cell or primary CC. Similarly, SB related PH field and $P_{CMAX,beam}$ fields may only be present if the PHR is being reported for a PUCCH secondary cell (SCell). As illustrated in FIG. 13, the PHR MAC CE extendedbeamPHR can be used to report beam based PHR for one primary cell and up to 7 serving cells or CC. In this example, PHR can be reported for up to four beams or group of beams for the primary cell and the PUCCH secondary cell while PHR may be reported for up to three beams or group of beams per other reported secondary cells. The example here also assumes in cell group, PUCCH resources may be configured for the primary cell and one additional SCell like in LTE. However, in NR it is possible that PUCCH resources are allocated on any secondary cell within a cell group. Therefore, for the reported Type x PH as illustrated in FIG. 13, x may also take the value 2.

The details of the newly proposed extended PHR MAC Control Elements are defined as follows:

$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2 and Type 3 PH, V=0 indicates the presence of the octet containing the associated $P_{CMAX,B}$ field, and V=1 indicates that the octet containing the associated $P_{CMAX,B}$ field is omitted;

Power Headroom (PH): this field indicates the power headroom level. The length of the field is 6 bits. The reported PH and the corresponding power headroom levels are shown in Table 1. An example of corresponding measured values in dB is illustrated in Table 2.

P: this field indicates whether the MAC entity applies power backoff due to power management as allowed by P-MPR$_{beam}$. The MAC entity may set P=1 if the corresponding P$_{CMAX,B}$ field would have had a different value if no power backoff due to power management had been applied;

P$_{CMAX,B}$ or equivalently P$_{CMAX,beam}$: if present, this field indicates the maximum UE configured transmit power as described herein and used for calculation of the preceding PH field. The reported P$_{CMAX,B}$ and the corresponding nominal UE transmit power levels are shown Table 3 and Table 4 respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method implemented by a wireless transmit/receive unit (WTRU), the method comprising:
   receiving power headroom control information;
   determining, based on the power headroom control information, that one or more conditions for generating a power headroom report have been met;
   generating, based on the determination that the one or more conditions for generating the power headroom report have been met, a beam-based power headroom report comprising one or more beam specific power headrooms of the serving cell; and
   reporting the beam-based power headroom report, wherein the beam-based power headroom is reported as a medium access control (MAC) control element (CE) identified by a MAC packet data unit subheader with a logical channel identifier that is specific to power headroom reporting,
   wherein the MAC CE has variable size,
   the MAC CE comprises a Type 2 power headroom (PH) field and an octet comprising the associated P$_{CMAX}$ field, if reported, and
   the MAC CE comprises a Type 1 PH field and an octet comprising the associated P$_{CMAX}$ field, if reported.

2. The method of claim 1, wherein the MAC CE further comprises an octet with the Type x PH field, wherein x is equal to 1 or 3, and an octet comprising the associated P$_{CMAX}$ field, if reported.

3. The method of claim 1, wherein the one or more conditions for generating beam-based power headroom report have been met further comprises determining a threshold path loss dB change associated with a synchronization signal block (SSB) and a bandwidth part (BWP) of a serving cell of a MAC entity with configured uplink is activated.

4. The method of claim 1, wherein the PHR MAC CE is used to report up to 7 serving cells or component carriers.

5. The method of claim 4, wherein the one or more conditions for generating beam-based power headroom report have been met further comprises determining a bandwidth part (BWP) of a serving cell of a medium access control (MAC) entity with configured uplink is activated.

6. The method of claim 4, wherein the MAC control element is an extended MAC control element.

7. A wireless transmit/receive unit (WTRU) comprising a processor and a memory, the memory storing computer-executable instructions which, when executed by the processor, cause the WTRU to perform operations comprising:
   receive power headroom control information;
   determine, based on the power headroom control information, that one or more conditions for generating a power headroom report have been met;
   generate, based on the determination that the one or more conditions for generating the power headroom report have been met, a beam-based power headroom report comprising one or more beam specific power headrooms of the serving cell; and
   report the beam-based power headroom report, wherein the beam-based power headroom is reported as a medium access control (MAC) control element (CE) identified by a MAC packet data unit subheader with a logical channel identifier that is specific to power headroom reporting,
   wherein the MAC CE has variable size,
   the MAC CE comprises a Type 2 power headroom (PH) field and an octet comprising the associated P$_{CMAX}$ field, if reported, and
   the MAC CE comprises a Type 1 PH field and an octet comprising the associated P$_{CMAX}$ field, if reported.

8. The WTRU of claim 7, wherein the MAC CE further comprises an octet with the Type x PH field, wherein x is equal to 1 or 3, and an octet comprising the associated P$_{CMAX}$ field, if reported.

9. The device of claim 7, wherein:
   the one or more conditions for generating beam-based power headroom report have been met further comprises:
   a threshold path loss dB change associated with a synchronization signal block (SSB); and
   a bandwidth part (BWP) of a serving cell of a MAC entity with configured uplink is activated.

10. The device of claim 7, wherein the PHR MAC CE is used to report up to 7 serving cells or component carriers.

11. The device of claim 10, wherein the one or more conditions for generating beam-based power headroom report have been met further comprises determining a bandwidth part (BWP) of a serving cell of a medium access control (MAC) entity with configured uplink is activated.

12. The device of claim 10, wherein the MAC control element is an extended MAC control element.

* * * * *